(12) United States Patent
Hoare et al.

(10) Patent No.: US 9,687,796 B2
(45) Date of Patent: Jun. 27, 2017

(54) CARBONATION DEVICE

(75) Inventors: Richard Hoare, Lane Cove (AU);
Andrew Grigor, Kensington (AU);
Stephen John McClean, Camden South (AU)

(73) Assignee: Breville Pty Limited, Alexandria, NSW (AU)

( * ) Notice: Subject to any disclaimer, the term of this patent is extended or adjusted under 35 U.S.C. 154(b) by 547 days.

(21) Appl. No.: 14/123,491

(22) PCT Filed: Jun. 4, 2012

(86) PCT No.: PCT/AU2012/000636
§ 371 (c)(1),
(2), (4) Date: Dec. 2, 2013

(87) PCT Pub. No.: WO2012/162762
PCT Pub. Date: Dec. 6, 2012

(65) Prior Publication Data
US 2014/0097549 A1    Apr. 10, 2014

(30) Foreign Application Priority Data
Jun. 3, 2011 (AU) ................................ 2011902180

(51) Int. Cl.
| B01F 3/04 | (2006.01) |
| A23L 2/54 | (2006.01) |
| B01F 13/04 | (2006.01) |
| B01F 15/00 | (2006.01) |
| G01F 13/00 | (2006.01) |

(Continued)

(52) U.S. Cl.
CPC ............ *B01F 3/04794* (2013.01); *A23L 2/54* (2013.01); *B01F 13/042* (2013.01); *B01F 13/047* (2013.01); *B01F 15/00155* (2013.01); *B01F 15/00162* (2013.01); *B01F 15/00253* (2013.01); *G01F 13/00* (2013.01); *G01F 17/00* (2013.01); *G01F 22/02* (2013.01)

(58) Field of Classification Search
CPC .. B01F 3/04794; B01F 13/042; B01F 13/047; B01F 15/00253; B01F 15/00162; B01F 15/00155; A23L 2/54; G01F 22/02; G01F 17/00; G01F 13/00
See application file for complete search history.

(56) References Cited

U.S. PATENT DOCUMENTS 1,966,854 A * 7/1934 Eskilson ............. B01F 3/04794
                                                    137/469
4,323,090 A * 4/1982 Magi .................... B01F 13/0033
                                                    141/279
(Continued)

FOREIGN PATENT DOCUMENTS

CA        2605668 A1 *  7/2003
DE  102010012175 A1 *  9/2011 ............... A23L 2/54
(Continued)

*Primary Examiner* — Amber R Orlando
*Assistant Examiner* — Stephen Hobson
(74) *Attorney, Agent, or Firm* — Molins & Co. Pty Ltd

(57) ABSTRACT

A domestic carbonation appliance has a replaceable $CO_2$ cylinder and accepts a refillable bottle with a removeable cap. The cap can cooperate with a carbonation head of a domestic carbonation device but lacks bayonette or thread features for engaging the carbonation head. The device provides for "one-touch" carbonation.

18 Claims, 22 Drawing Sheets

(51) Int. Cl.
*G01F 22/02* (2006.01)
*G01F 17/00* (2006.01)

(56) References Cited

U.S. PATENT DOCUMENTS

| | | | | | |
|---|---|---|---|---|---|
| 4,610,282 | A | * | 9/1986 | Brooks | B01F 3/04801 141/46 |
| 4,999,140 | A | * | 3/1991 | Sutherland | B01F 3/04801 141/18 |
| 5,031,799 | A | * | 7/1991 | Owen | B01F 3/04794 137/212 |
| 5,329,975 | A | * | 7/1994 | Heitel | B01F 3/04801 141/19 |
| 5,339,874 | A | * | 8/1994 | Cragun | B67C 3/06 141/104 |
| 5,758,700 | A | * | 6/1998 | Vanderploeg | B67D 1/008 141/113 |
| 2004/0206157 | A1 | * | 10/2004 | Chen | G01N 7/16 73/19.05 |
| 2006/0112831 | A1 | * | 6/2006 | Greenwald | A47J 31/465 99/275 |
| 2008/0105989 | A1 | * | 5/2008 | Rona | B01F 3/04531 261/50.1 |
| 2011/0020508 | A1 | * | 1/2011 | Santoiemmo | A23L 2/54 426/232 |
| 2011/0220209 | A1 | * | 9/2011 | Schori | B01F 3/04794 137/2 |
| 2013/0081443 | A1 | * | 4/2013 | Rasmussen | B67D 1/0431 73/19.06 |
| 2014/0239521 | A1 | * | 8/2014 | Ergican | B67D 1/0058 261/115 |

FOREIGN PATENT DOCUMENTS

| | | | | |
|---|---|---|---|---|
| EP | 1351758 | B1 * | 10/2003 | B01F 3/04801 |
| GB | 2137894 | A * | 10/1984 | B01F 13/0033 |
| WO | WO 0103817 | A1 * | 1/2001 | A23L 2/54 |

* cited by examiner

CARBONATION DEVICE

FIELD OF THE INVENTION

The invention pertains to carbonation devices and more particularly to carbonation devices for domestic use.

BACKGROUND OF THE INVENTION

Domestic carbonators are well known. These devices operate by injecting pressurised carbon dioxide into a liquid that is contained in a sealed bottle. The present invention aims to improve known devices and methods by simplifying and automating aspects of the carbonation process and by providing additional sophistication in the construction of the device and the bottles that are used during the carbonation process.

Known domestic carbonation devices require a threaded or bayonet coupling assembly between the bottle to be carbonated and the carbonation head prior to starting the carbonation process. These types of coupling arrangements generally require two hands. In some prior art units that do not have water delivery, the bottle is being handled while full, making the coupling procedure more difficult owing to the weight of the open and full bottle.

Conventional domestic carbonation devices require the lid of the bottle to be carbonated to be affixed after the carbonation process is complete. When the freshly carbonated liquid is exposed to the atmosphere before the lid or cap is affixed, $CO_2$ is released. In effect, the recently carbonated liquid begins to go flat as soon as the carbonation process stops.

In those domestic carbonation devices that have manually adjustable carbonation levels, the mechanisms are sometimes unreliable and lack the ability to be configured by the user. These types of devices sometimes rely on the user reacting to an auditory indicator to discontinue carbonation. Low carbonation levels are difficult to achieve and the results are generally not repeatable without considerable discrepancies in the results and carbonation levels.

Consumer standards also require the safe operation of carbonation devices, particular when using glass bottles. Glass bottles under pressure can fracture or rupture.

Some prior art domestic carbonators are associated with difficulties in replacing the pressurized $CO_2$ cylinder that supplies gas to the device. Some machines need to be inverted or lifted the height of the $CO_2$ cylinder in order to couple the $CO_2$ cylinder onto the $CO_2$ valving and coupling assembly.

OBJECTS AND SUMMARY OF THE INVENTION

It is an object of the invention to simplify the domestic carbonation process by providing a safe device that is capable of initiating and completing the carbonation of a bottle containing liquid, requiring only a single user action or "one touch" action to begin and complete the carbonation process.

It is another object of the invention to provide a domestic carbonation device that provides improved control over and monitoring of the carbonation process and its outcome.

It is another object of the invention to provide a refillable bottle fill cap that is adapted to cooperate with a fill head of a device made in accordance with the teachings of the present invention.

It is another object of the invention to provide a fill cap device for a bottle that is used in domestic carbonation appliance carbonation head, but lacking bayonette or thread features for engaging the carbonation head, the cap having an internal reciprocating piston that opens and closes a passageway into the interior of a bottle to which it may be attached.

It is yet another object of the invention to provide a domestic carbonation device having a carbonation fill head having through which a passageway that distributes pressurised $CO_2$ to an interior of a bottle and a second passageway communicate a pressure within the bottle to a pressure transducer that provides a pressure indication to a microprocessor or other control means.

It is a further object of the invention to provide a domestic carbonation device with a protective enclosure having a protective door that is closed by a motor in the device prior to a carbonation process and having a safety interlock that inhibits a user from opening the door during the process.

It is another object to provide a means for enabling a user to input to the device, a desired carbonation level, the device having a pressure transducer for measuring a $CO_2$ pressure within a bottle to be carbonated, the device having a microprocessor that will stop a carbonation process when a desired carbonation level has been achieved in the bottle.

It is also an object to provide a domestic carbonation device having a solenoid venting valve that reciprocates so as to open or close a $CO_2$ vent, the vent being sealed by the valve when the device is dispensing $CO_2$ and being opened by the valve to remove an unnecessary pressure, from the device.

It is yet a further object of the invention to provide a pressurized $CO_2$ delivered from a cylinder to drive a portion of a dispensing head into engagement with a sealed bottle, the bottle remaining sealed both before and after a hands-free filling.

It is an object of the invention to provide, in a domestic carbonation device, a switch that provides a signal to a microprocessor regarding a state of a protective door and allowing the microprocessor to detect when the door is not fully closed.

It is an additional object of the invention to provide a domestic carbonation fill head having a cylinder that contains a reciprocating primary piston with a dispensing bore that dispenses $CO_2$ from a supply opening located on a distal tip of the piston, the piston having guide skirt that is adapted to cooperate with a size and shape of a cap of a bottle whose contents are being carbonated.

It may be an object of the invention to provide a fill cap for a refillable liquid bottle for use in domestic carbonation device, comprising:
a valve mechanism having a piston and a cylinder, the valve dispensing into a space having a small discharge opening that admits pressurized $CO_2$ into the interior of the bottle and prevents influx of liquid into the valve mechanism of the fill cap.

It is another but not exclusive object of the invention to provide in a domestic carbonation device, a pressure transducer that takes a pressure reading from an interior of a bottle, the reading being used by a microprocessor in the device to determine a volume of liquid contained in the bottle and thereby prevent an over pressurization of the bottle.

It is also another object of the invention to provide a domestic carbonation device with a fill head having a piston that is advanced with an electric motor to causes a vertically reciprocating motion of the fill head in synchrony with the operation of cylinder coupling discharge valve.

BRIEF DESCRIPTION OF THE DRAWING FIGURES

In order that the invention be better understood, reference is now made to the following drawing figures in which.

BEST MODE AND OTHER EMBODIMENTS

Figure 1:
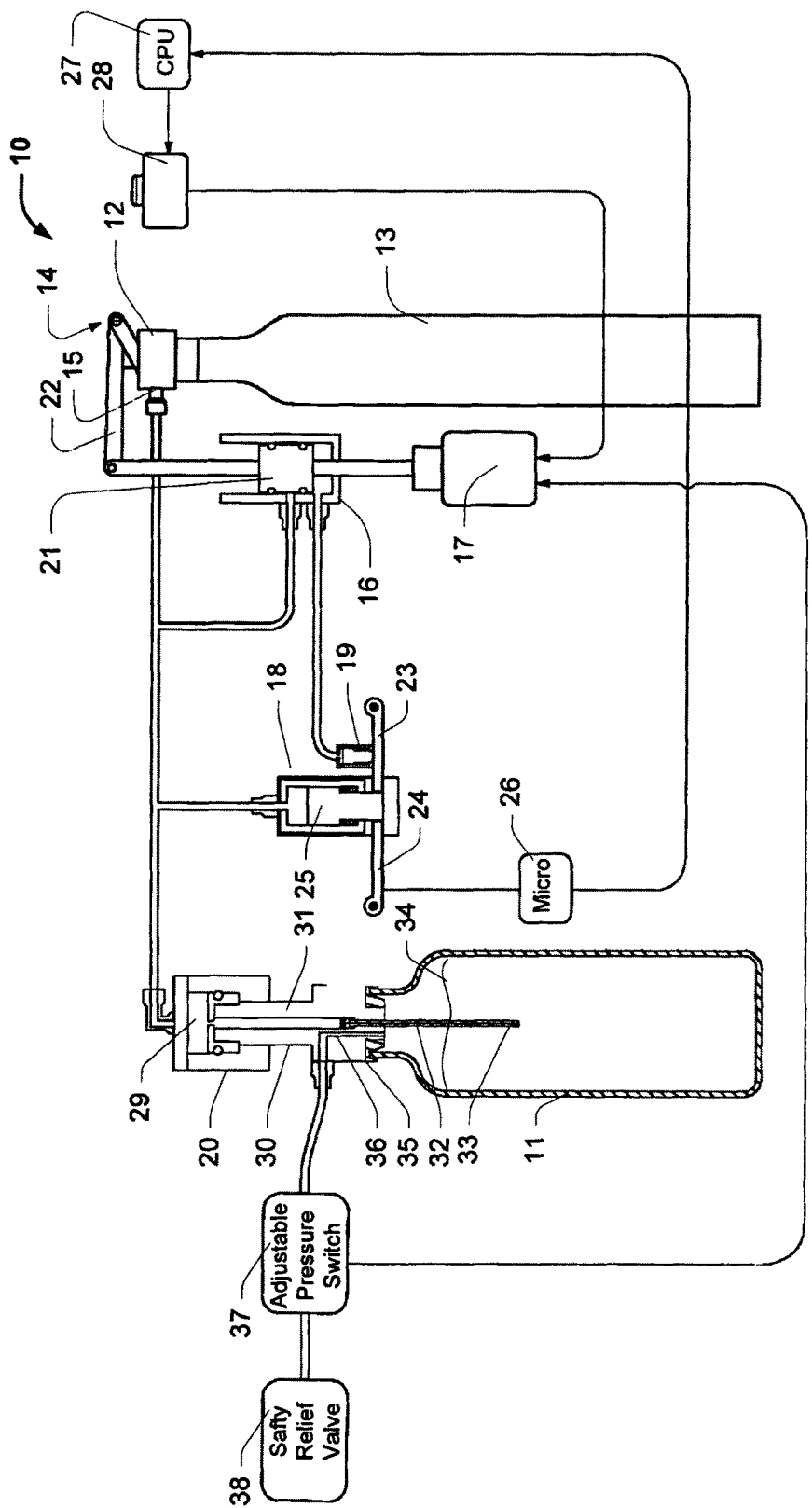
FIG. 1 is a schematic view of an embodiment of a domestic forced carbonation device and cooperating bottle.

As shown in FIG. 1, a device 10 for force carbonating the liquid in a bottle with no thread or bayonet fitting to connect it with a fill head. The device has a primary dispensing coupling or valve 12 that is adapted to receive an interchangeable carbon dioxide ($CO_2$) cylinder 13. The valve 12 includes an activation assembly 14 and an outlet 15. The outlet supplies $CO_2$ to components required by the carbonator 10, through a network of suitable piping or tubing. $CO_2$ from the cylinder 13 is supplied to a diverter valve 16 that is activated by (for example) a solenoid 17. $CO_2$ is also selectively routed to a locking assembly 18, a door opening apparatus 19 and bottle fill head assembly 20.

As shown in FIG. 1, the solenoid 17 and diverter 16 are shown in a "fill" orientation. In this orientation, a piston 21 in the diverter allows pressurised $CO_2$ flows through to those locations where pressurised $CO_2$ is required but not to the door opening mechanism 19. A mechanical linkage 22 from the piston 21 (or from the solenoid 17, or otherwise) to the activator 14 serves to open the valve in the head 12. When the solenoid 17 and diverter 16 are in the position depicted in FIG. 1, the one or more user operable doors 23, 24 that isolate the bottle to be filled 11 within the device are locked by the action of a piston 25 within or associated with the locking devices 18. The piston 25 thus receives $CO_2$ from the tank 13 and when pressurised prevents the doors from opening while the bottle 11 is being filled. The doors are preferably transparent but adapted to protect and prevent user access to the bottle 11 when a bottle 11 is being filled. In preferred embodiments, the door or doors 23, 24 cooperate with e.g. a micro switch or other switch 26 whose circuit open or circuit closed state is monitored by the device's central processor unit 27. The interlocking of the doors 23, 24 with the microprocessor 27 via the micro switch 26 prevents the discharge of pressurized $CO_2$ into the system unless the doors 23, 24 are fully closed and preferably locked by the locking device 18.

Thus, when the doors 23, 24 are closed, the CPU will allow a user-activated switch 28 to activate the solenoid 17. The activation of the solenoid will cause compressed $CO_2$ from the cylinder 13 to activate the locking device 18. Simultaneously, pressurised $CO_2$ is supplied to the fill head assembly 20. In this example, pressurized gas in the head space in the fill head assembly 20 causes the lowering of the piston-like and reciprocating coupling assembly 30. The coupling assembly 30 is biased upward by a spring or the like and can only be lowered toward the bottle 11 by $CO_2$ pressure in the head space 29. In this example, pressure in the head space 29 is also communicated by a central bore 31 to a reciprocating discharge tube 32. FIG. 1 illustrates the discharge tube 32 in its lowermost position whereby the tip 33 of the tube is below the liquid level 34 in the bottle 11. When the pressure in the head space 29 is relieved, a return spring will cause the retraction of the fill tube 32 to within the interior space of the reciprocating coupling assembly 30. The lower part of the coupling assembly 30 comprises a coupling interface 35 that is adapted to receive the bottle 11. In preferred embodiments, neither the coupling interface 35 nor the bottle 11 are threaded. Thus, the coupling interface 35 is preferably a seal-like elastomeric material that can maintain the internal pressure in the bottle 11 without leaking under compression only, during the filling of a bottle.

In the example of FIG. 1, the fill coupling assembly 30 has a port 36 that communicates between the inside of the bottle 11 and a tube that connects to an adjustable pressure switch 37. The adjustable pressure switch 37 senses or monitors the internal pressure of the bottle 11 and de-activates the solenoid 17 (either directly or indirectly via the CPA 27) in order to terminate the carbonation process when a pre-established pressure is reached in the (e.g.) top of the bottle 11. The adjustable pressure switch 37 also allows excess pressure to be discharged through a cooperating safety release valve 38.

Figure 2:
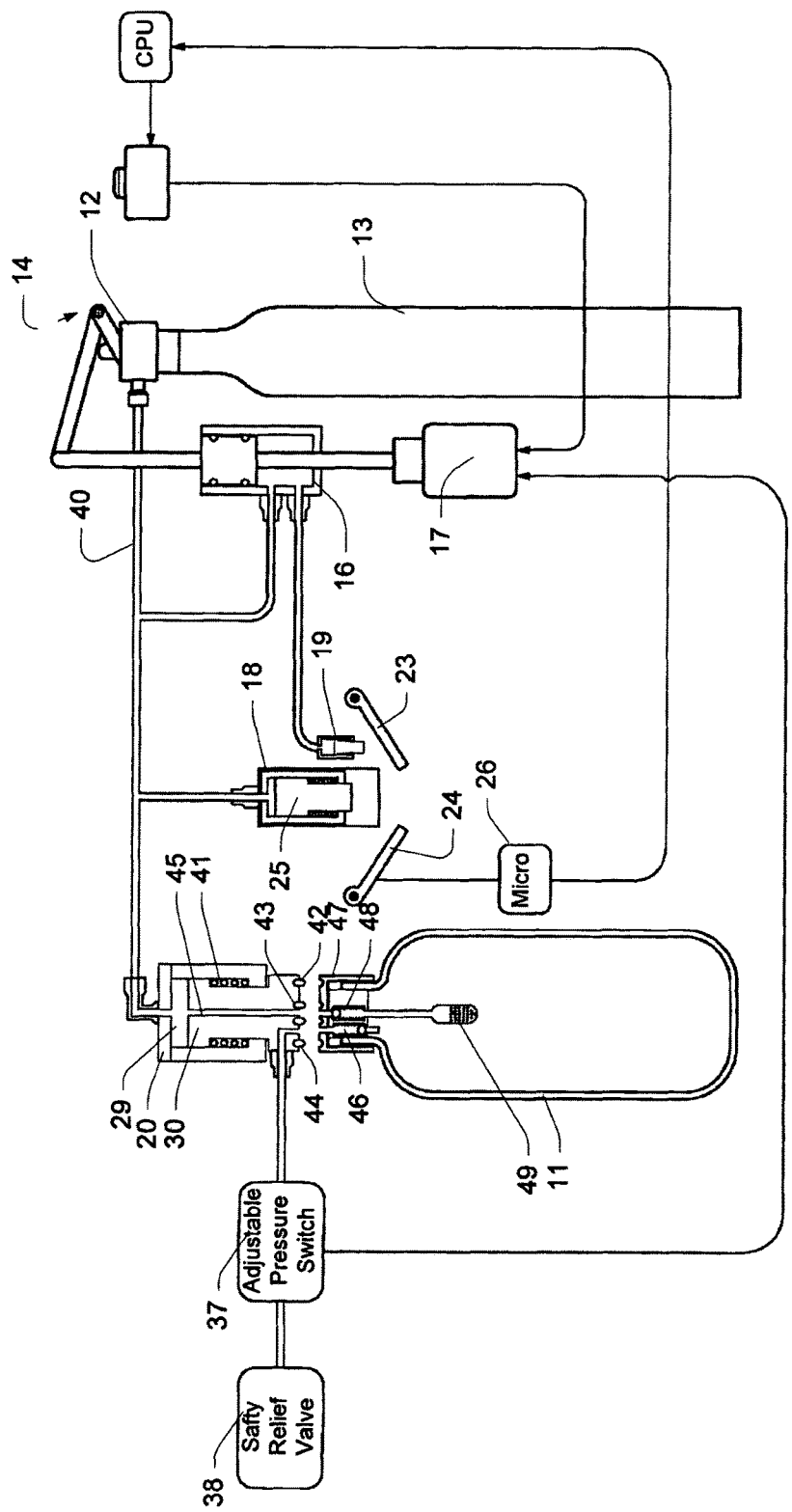
FIG. 2 is a schematic diagram similar to FIG. 1.

The system depicted in FIG. 1 is shown in a de-pressurised state in FIG. 2. This state corresponds to how the device 10 appears both before and after a completed carbonation operation. In this state, the solenoid 17 is depicted as being "off" or extended, thus de-activating the primary valve assembly 14 in the valve 12. This prevents pressurised $CO_2$ from reaching the locking assembly 18 or the fill head 20. Accordingly, in the locking assembly 18, the return spring 39 causes the retraction of the piston 25, allowing the door or doors 23, 24 to unlock and be opened. When the doors are open, the interior of the device, including the bottle 11 can be accessed by the user. When the valve 16 is deactivated by the solenoid 17, residual pressure is the $CO_2$ supply tube 40 is vented through the valve 16 to the door opening mechanism 19. The door opening mechanism 19 can be a cylinder or other form of pneumatic motor that causes the doors 23, 24 to open in a controlled fashion. As the pressure in the supply tube 40 decreases, the return springs 41 in the fill head 20 cause the retraction of the coupling assembly 30. In the example of FIG. 2, the coupling assembly 30 comprises a lower coupling surface 42 that is subdivided by a pair of preferably concentric sealing O-rings 43, 44. In this example the innermost area (defined by the inner O-ring 43) comprises a port 41 that communicates with the interior 29 of the fill head assembly 20. A ring or annulus between the inner O-ring 43 and the outer O-ring 42 comprises a second port 36 that communicates between the bottle 11 and the adjustable pressure switch 37 and thus the safety relief valve 38. In preferred embodiments, the second port 36 also cooperates with a check valve 46 located on the (preferably) threaded cap 47 that seals the bottle 11. The check valve 46 allows the internal pressure of the bottle 11 to be communicated to the adjustable pressure switch 37. The primary fill port 45 cooperates with a second check valve 48 that allows pressurised $CO_2$ to enter the bottle but not leave it. The second check valve 48 communicates with either a fill tube that descends into the internal liquid volume or with a carbonation stone 49, for example, a porous, sintered ceramic stone that increases the surface area of contact between the pressurised $CO_2$ and the liquid contents of the bottle 11. In this example, the first and second check valves 46, 48 and the carbonation stone 49 are all carried by the removable cap 47. The O-rings 42, 43 of the reciprocating fill coupling 30 cooperate with the upper surface of the cap 47 in compression only, for example, by way of preferably concentric grooves that are adapted to receive the O-rings 42, 43.

Figure 3:
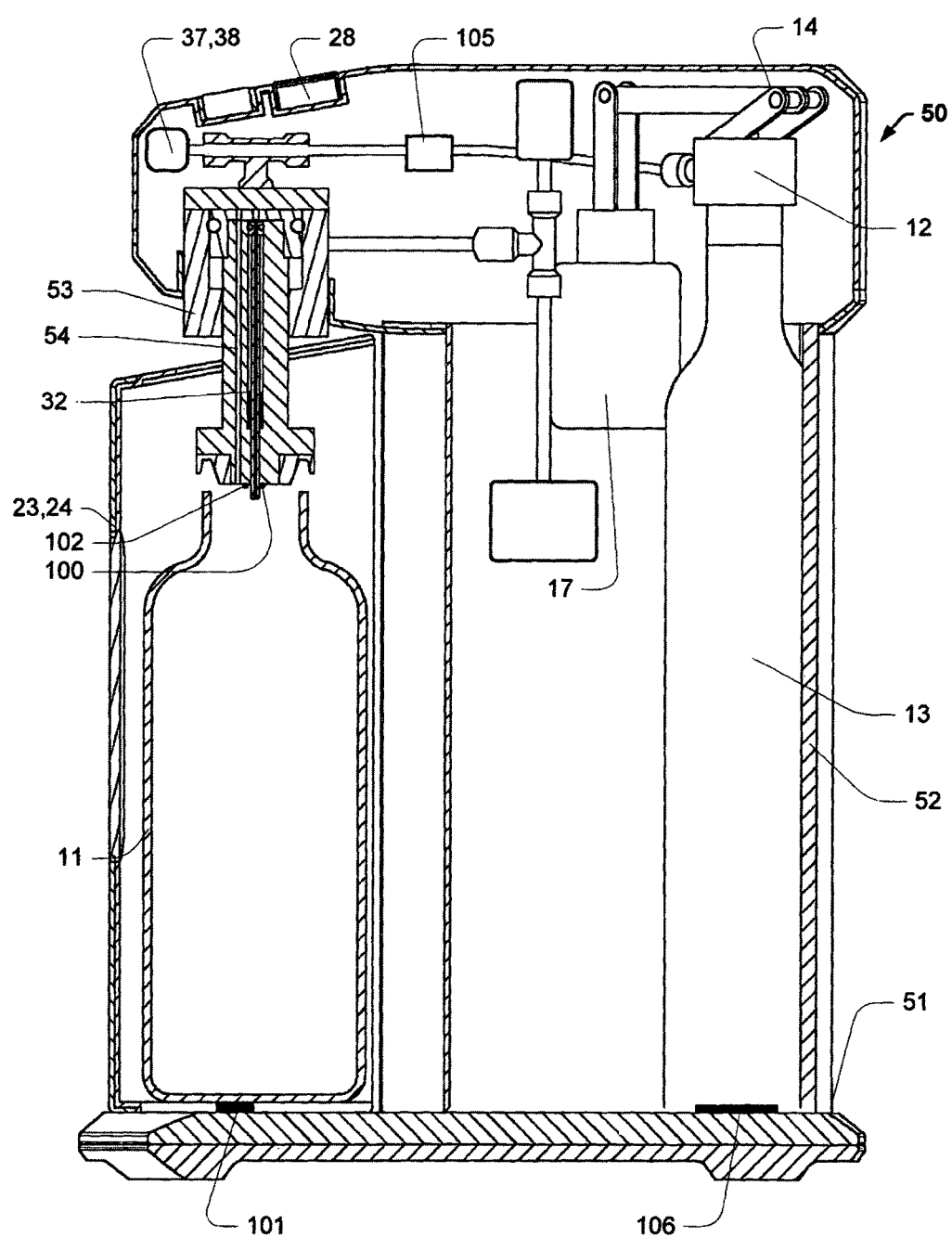
FIG. 3 is a side elevation, cross-sectioned to reveal the interior of a domestic beverage carbonation device.

As suggested by FIGS. 1 and 2 and as shown in FIG. 3, a tabletop device 50 can be used to carbonate the liquid contents of a bottle 11. As shown in FIG. 3, such a device comprises, in this example, a base 51 upon which is mounted a chassis 52 that is adapted to rigidly support the fill head assembly 53 and its reciprocating fill coupling 54. The chassis 52 is also adapted to resist the forces imposed on it by the compressive clamping of the bottle n between the fill coupling assembly 54 and the base 51. As suggested, the fill coupling assembly 53 is at least partially contained within a head enclosure 54 that is located above the door or doors 23, 24. The doors 23, 24 isolate the bottle 11 and the pressurised $CO_2$ during filling from the user of the device. As previously mentioned, it is preferred that the doors 23, 24, be closed and locked (or inoperable) while pressurised $CO_2$ is being injected into the bottle 11.

Figure 5:
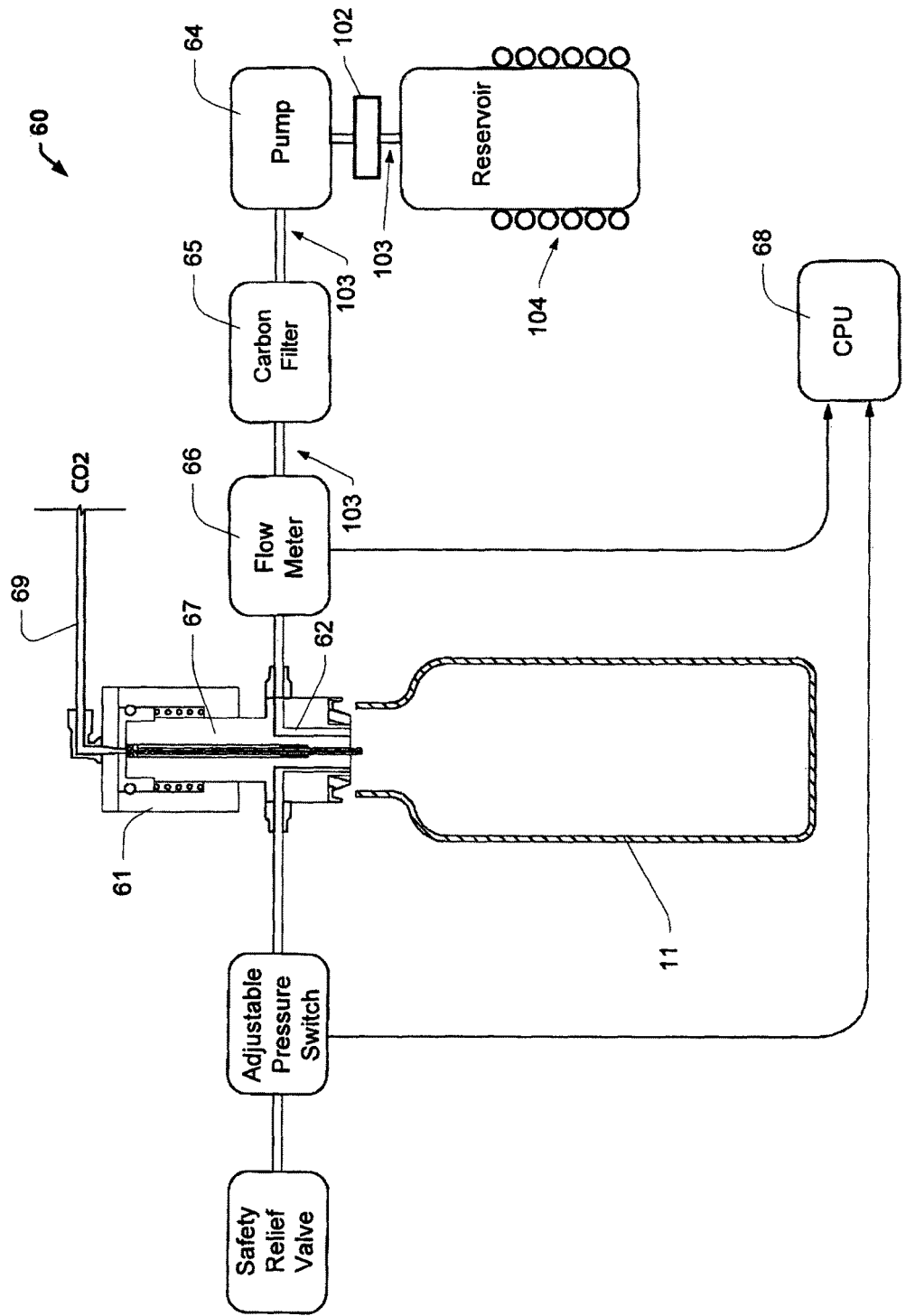
FIG. 5 is a schematic diagram of another embodiment of a carbonation device.

In some embodiments of the invention, temperature sensors are used to measure the temperature of the liquid inside of the bottle 11. The temperature provides an indication of the $CO_2$ holding capacity of the liquid in the bottle 11. As shown in FIG. 3, a temperature 100 can be mounted onto the fill tube 32 that extends into the liquid. The information from the temperature sensor 100 is provided to the CPU 27 whereupon the information is used to calculate $CO_2$ delivery parameters. In the alternative, a temperature sensor 101 can be located on the device itself 10, adjacent to an outer surface of the bottle 11. Similarly a pH sensor 102 may be provided on the fill tube 32 or, in the supply line 103 that distributes drinking liquid from the reservoir 63 (see FIG. 5). The liquid reservoir 63 may also be provided with refrigeration. In the example of FIG. 5, refrigeration coils 104 are located closely adjacent to the exterior of the reservoir 63.

In some embodiments, it will be useful to determine the amount of $CO_2$ in the cylinder 13. FIG. 3 illustrates two ways of accomplishing this. In one embodiment, a pressure sensor 105 is mounted in the output line of the cylinder 13. Information from the pressure sensor is supplied to the CPU 27. Another method of determining the amount of CO, in the bottle is to weigh the bottle in situ. FIG. 3 illustrates a load cell 106 located below the cylinder 13 that can provide weight information to the CPU 27.

Figure 4:
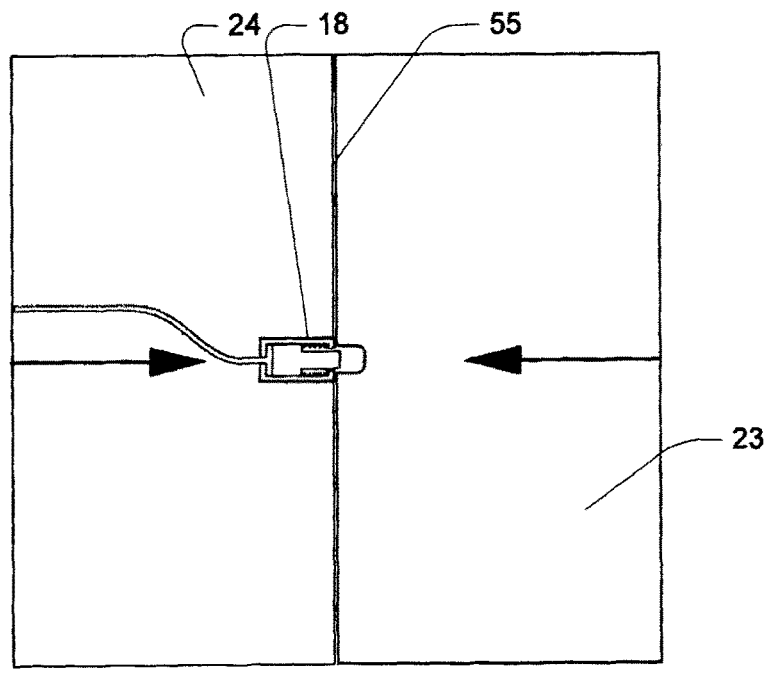
FIG. 4 illustrates, schematically, door arrangements for a device like the one shown in FIG. 3.
Figure 4:
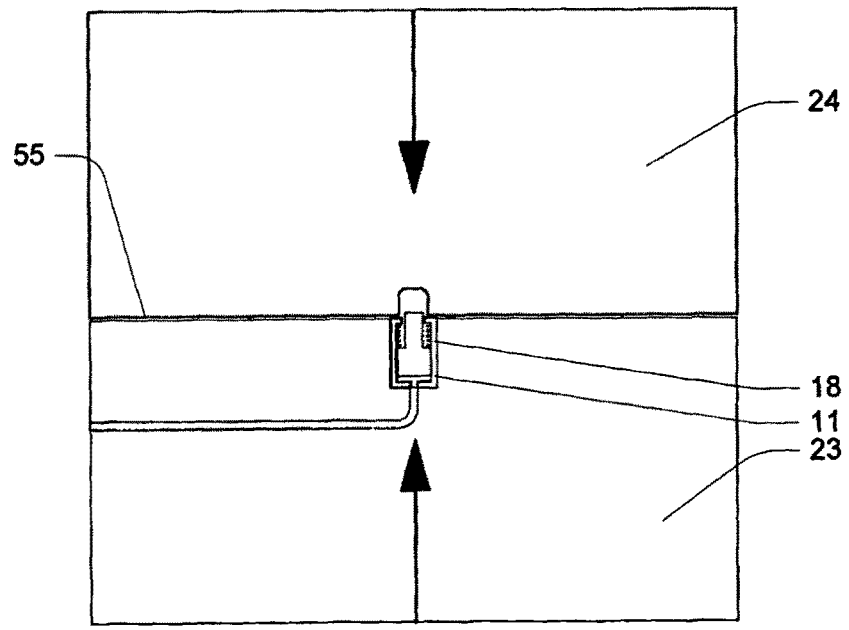

As shown in FIG. 4, the one or more doors 23, 24 can be arranged to be hinged from their outside edges so that the join 55 between a pair of doors (or the free edge of a single hinged door) is either horizontal or vertical. FIG. 4 also demonstrates the interlocking of a pair of doors, 23, 24 by the gas activated locking assembly 18. The doors may be interlocked to one another, or locked with reference to the chassis or base of the device.

Another forced carbonation device 60, shown in FIG. 5 and comprises a gas activated fill head assembly 61 similar to the devices suggested by FIGS. 1-3, except that it includes a third port 62. The third port 62 communicates between the interior of the bottle 11 and a liquid reservoir 63. Normally, the reservoir 63 will contain water or another liquid for making a carbonated beverage. The liquid is the reservoir 63 is fed by a pump 64, through a carbon (or other) filter 65 to the third port 62, the supply line between the reservoir 63 and the third port 62 also has an in-line flow meter 66. In this example, the flow meter is located between the carbon filter 65 and the reciprocating coupling assembly 67. The flow meter provides information regarding the rate (or volume) of liquid flow to the device's central processing unit 68. The information communicated to the CPU 68 can be used by the CPU to determine the total volume of liquid dispensed to the bottle 11. This information can be used, in conjunction with other information (such as temperature and time information) to determine the appropriate filling parameters, for example, the correct time to shut off the flow of $CO_2$ from the supply line 69 to the filling head 61.

Figure 6:
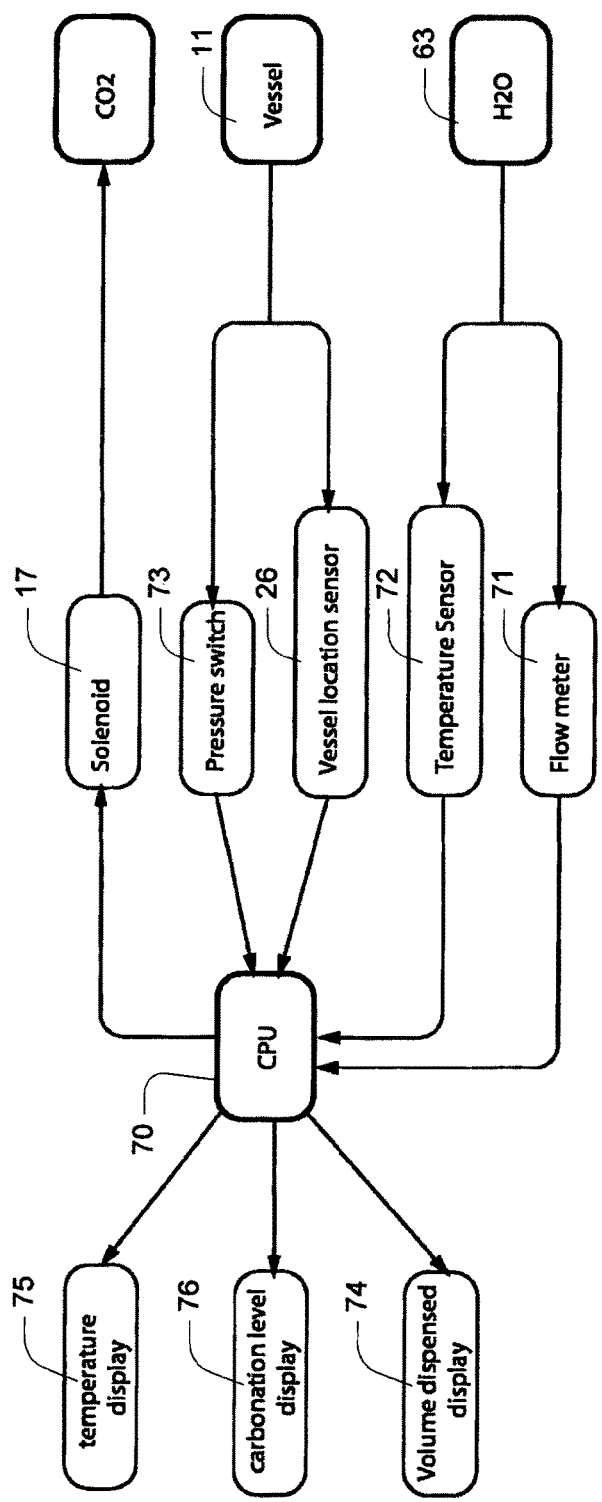
FIG. 6 is a flow charge illustrating the functionality of a central process unit in a domestic carbonation device.

The basic operation of the CPU 27, 70 and the device as a whole can be appreciated from a consideration of FIG. 6. As shown in FIG. 6, the CPU 70 receives inputs such as the rate of flow or flow volume from a liquid flow meter 71, a temperature sensor 72 that determines the temperature of the contents of the bottle 11 and the bottle's internal pressure from the adjustable pressure activated switch 37, 73. The CPU can also receive an indication of the presence or location of the bottle 11, for example, from a location sensor that either directly detects the presence of the bottle 11 or, for example, indirectly via the microprocessor 26 that indicates when the door or the doors to the device 10 are closed. The CPU also drives one or more graphic displays, for example, a display of the temperature of the liquid in the bottle 11, 75, a display 76 of the carbonation level, or a display 74 of the volume of liquid dispensed into the bottle 11. The CPU 70 is also used to activate the solenoid 17 that activates the main valve 16.

Figure 7:
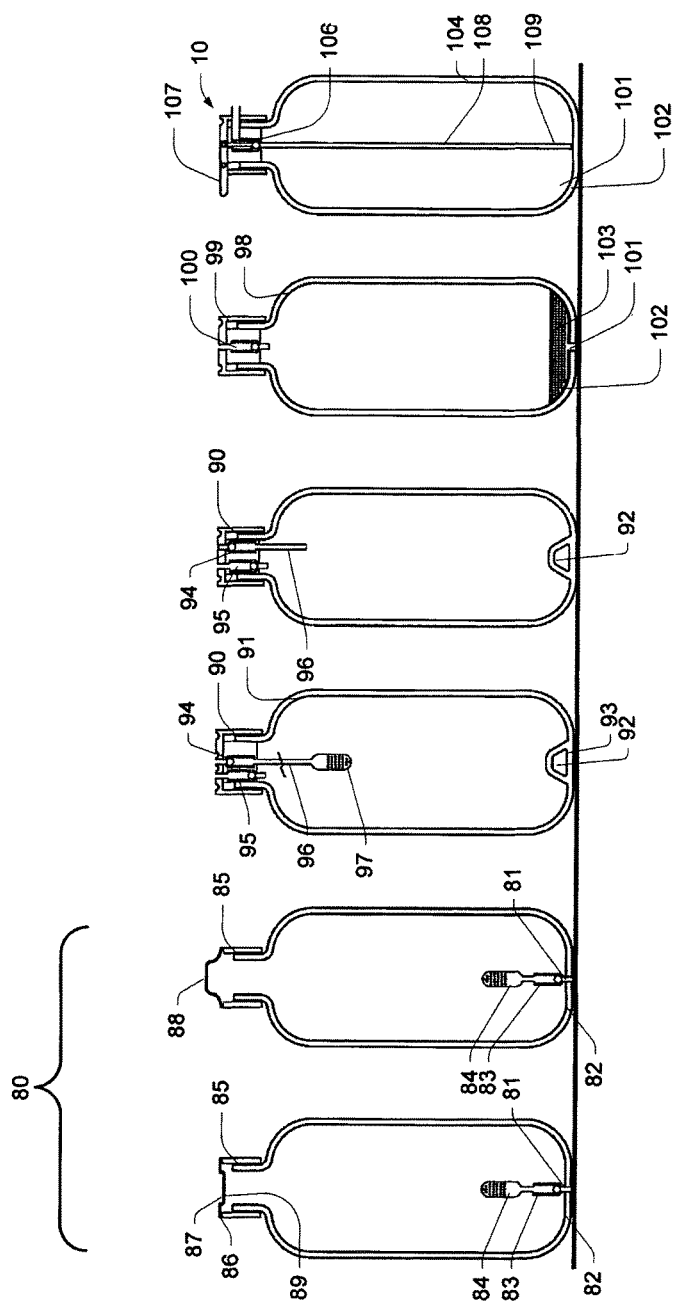
FIG. 7 illustrates, in cross section, embodiments of a bottle for use in a domestic carbonation device.

In preferred embodiments, the carbonation device 10 of the present invention is adapted to cooperate with specially configured vessels or bottles 11 that are preferably not screwed onto the fill coupling assembly. Some examples of suitable bottle 11 are depicted in FIG. 7. A first type of bottle 80 has a fill port 81 located on a lower surface 82. The fill port 81 contains a check valve 83 and may optionally discharge through a carbonation stone 84 located close or adjacent to the check valve 83. In some embodiments, the removable cap 85 includes a fill indicator 86 that provides a visible indication of when the bottle's contents are pressurized. In this example, the indicator 86 comprises a resilient diaphragm or web 87 that extends visibly upwardly 88 when the pressure within the bottle is greater than the atmospheric pressure. Relieving the pressure exerted on the diaphragm 88 causes it to retract 89.

In another embodiment, the bottle has a removable cap 90 of the type previously discussed with reference to FIG. 2. However, this bottle 91 has a permanent magnet 92 located in or closely adjacent to the lower surface of the bottle 93. The magnet 92 can be used to orient the bottle with reference to the supporting floor in the device 10 and also to interact with a sensor in the device 10 that can be used to indicate the presence of absence of the bottle to a location sensor that supplies this information to the CPU 27, 70.

As an alternative or an addition to the magnet 92 an RFID chip 93 can be associated with each bottle, for example by embedding it in the base of a bottle. The RFID chip 93 can be read or written to by a transponder located in the base of the carbonator 10 and can be used to identify the bottle type, bottle owner, contents, fill parameters or other information.

The cap on a bottle 91 is shown to have a first port and check valve 94 that is used as the bottle is carbonated and a second check valve 95 that can be used either to relieve excess pressure within the bottle or that can be selectively deactivated so that the pressure within the gaseous head space of the bottle can be monitored during the filling process. The vertical tube 96 that directs the incoming $CO_2$ to the contents of the bottle may be provided with a carbonation stone 97, or not.

In other embodiments 98 the removable closure 99 contains a check valve 100 similar to the check valve 95. The bottle 98 also has a carbonation port 101 located on or adjacent to an underside 102 of the bottle and a carbonation stone 103 closely adjacent to the fill port 101. In this example, the carbonation stone 103 occupies a substantial cross section of the lowermost volume of the internal space of the bottle.

Also depicted in FIG. 7 is a bottle 104 having a cap with a discharge mechanism 105. The discharge mechanism 105 has a discharge valve 106 that can be user activated, for example by a lever or button 107. A discharge tube 108 extends from the discharge valve 106 to a location 109 close to the bottom of the bottle.

Figure 8:
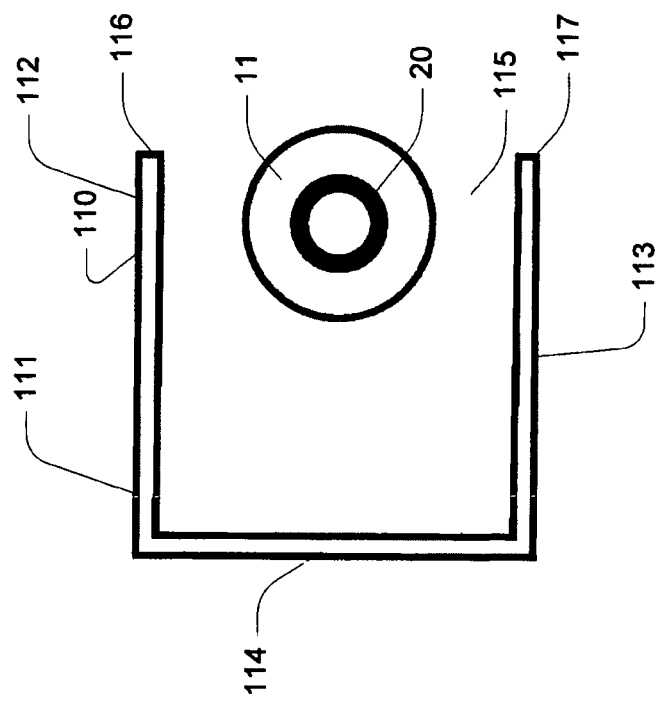
FIG. 8 is a schematic plan view of a chassis for a domestic carbonation device.

Embodiments of the invention that have been previously disclosed rely on a reciprocating fill coupling, (e.g. 30) $CO_2$. Pressure drives the fill coupling toward the bottle and serves to clamp and immobilise the bottle between the device's chassis or base and the stationery parts of the fill head assembly 20. Because the reciprocating coupling must not be lifted off of the bottle 11 by the pressurized $CO_2$ that is injected into the bottle, the compressive force exerted onto the bottle must be resisted by the chassis that supports the fill head assembly 20. Accordingly, the chassis must be constructed to stably accommodate tensile and/or bending forces associated with the force imposed by the reciprocating fill coupling on the bottle 11 that it is filling. One way to accomplish this is to have the chassis of the device 110 shaped as a rigid channel 111, as shown in FIG. 8. In this example, the channel in has flat, parallel sides 112, 113 that are interconnected by a transverse portion 114. The transverse portion 114 may be integral with the sides 112, 113 or may be affixed to the sides with fasteners or adhesives. The bottle 11 thus sits below the fill head assembly 20 and at least partially contained within the opening 115 formed by the free ends 116, 117 of the sides 112, 113 of the chassis. The hinged door or doors 23, 24 (e.g. see FIGS. 1-4) are used to enclose the opening 115.

Figure 9:
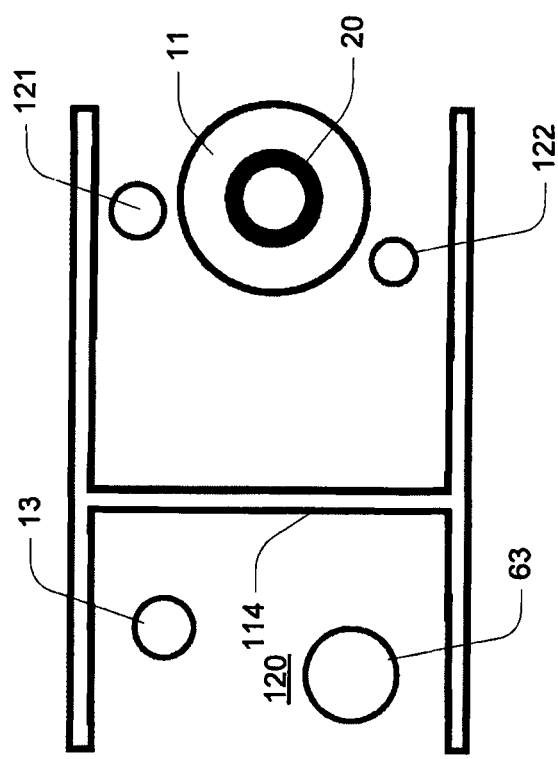
FIG. 9 is another schematic plan view of a domestic carbonation device.

As shown in FIG. 9, the "C" shaped channel depicted in FIG. 8 can be modified to a "H" shape so as to further comprise a partially enclosed protected space 120 located behind the transverse portion 114. From the user's perspective the presence of the transverse member 114 isolates the user from whatever components are located in the protected space 120. The pressurised $CO_2$ cylinder 13, the reservoir 63 and other components may be located behind the transverse portion 113. In the alternative, the tensile forces on the chassis associated with the pressure exerted by the reciprocating coupling assembly 30 can be accommodated by vertical posts or column-like elements 121, 122 located preferably laterally and to either side of the fill head assembly 20.

It will be appreciated from the aforementioned disclosure that all of the disclosed embodiments have the capability, once an appropriate bottle 11 is located within the device 10, to couple to the bottle 11, fill it, and release the coupling attachment with only a single user action required. The single user action is referred to as a "one touch" capability. The one touch capability results from the use of CO, gas from the cylinder 13 as a means of operating the reciprocating fill coupling, the locking of the doors, the opening of the doors and the carbonation of the liquid in the bottle 11. Although the devices of the present invention may require auxiliary electrical power for the operation of the CPU and solenoid activated diverter and the graphic displays, $CO_2$ pressure is used to perform all the working functions of the device.

Figure 10:
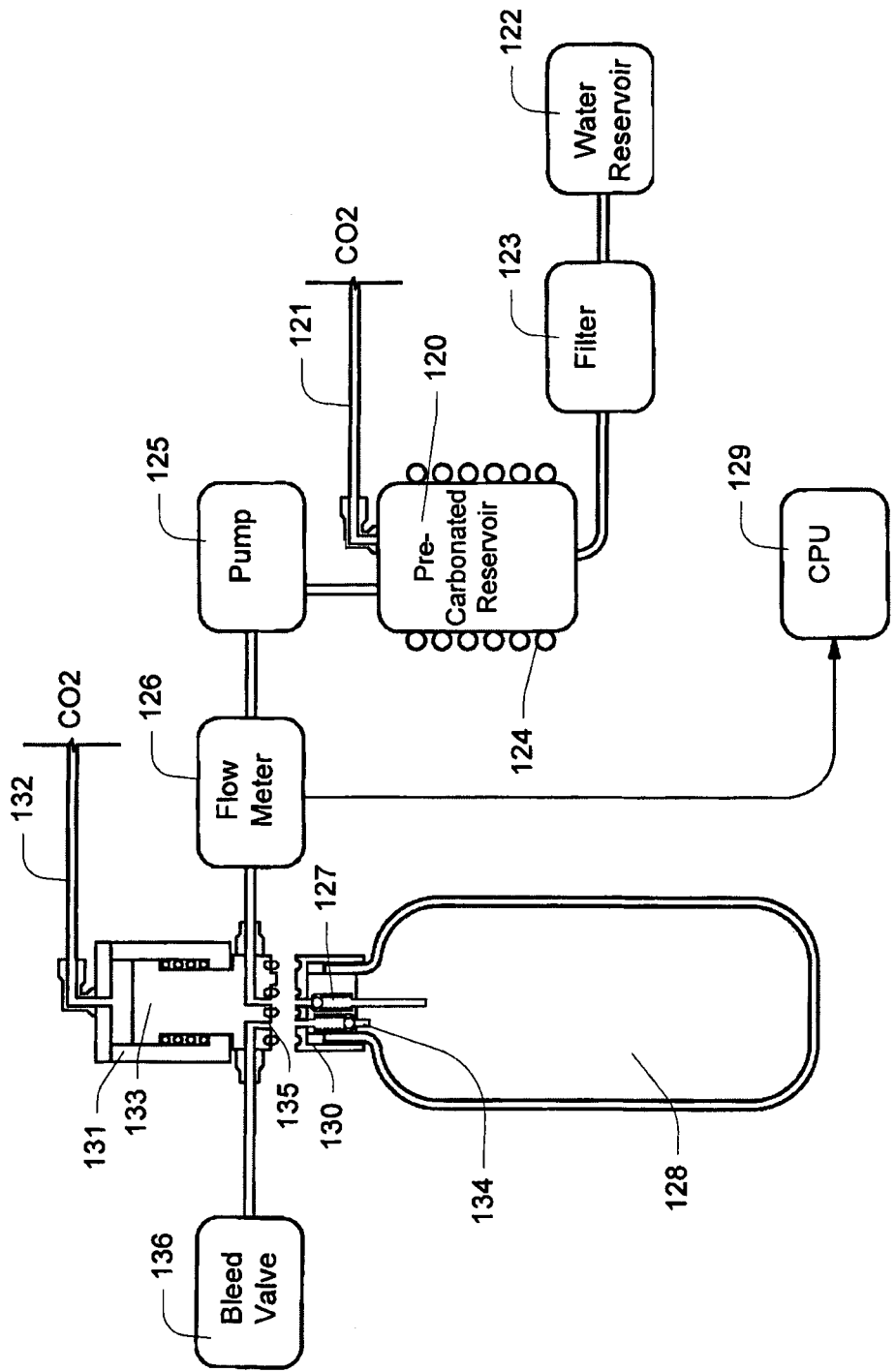
FIG. 10 is schematic diagram of another embodiment of the invention, utilising a pre-carbonated reservoir.

As shown in FIG. 10, in another embodiment of the invention a bottle 128 is filled from a first, pressurized reservoir of pre-carbonated liquid such as water 120. In this example, the user fills the reservoir 120 with e.g. water and carbonates it from a first carbonation line 121. In preferred embodiments, a plain water supply or reservoir 122 fills the reservoir 120 via a filter 123. The pressurized reservoir 120 may be refrigerated 124. The pre-carbonated contents of the pressurized reservoir 120 are supplied by a pump 125 and pass through a flow meter 126 to the fill valve 127 in the cap of a bottle 128. The flow meter 126 provides flow or volume information to the device's CPU 129. As with other embodiments, this arrangement allows a user to fill a bottle and remove it from the device while the bottle remains substantially sealed from the atmosphere at all times. In this example, the fill head assembly 131 is activated from a second $CO_2$ line 132. The source for the first and second $CO_2$ lines 121, 132 can be the same pressurized cylinder of $CO_2$. Because the bottle is being filled with pre-carbonated liquid, the $CO_2$ 132 to the fill head assembly 131 is only used to operate the reciprocating coupling 133. An electric solenoid may be used in place of the reciprocating, $CO_2$ activated coupling 133. In this example, excess pressure in the bottle 128 is relieved by a second valve 134 in the cap 130 that discharges through a sealed port 135 in the coupling 133 to a bleed valve 136.

Figure 11:
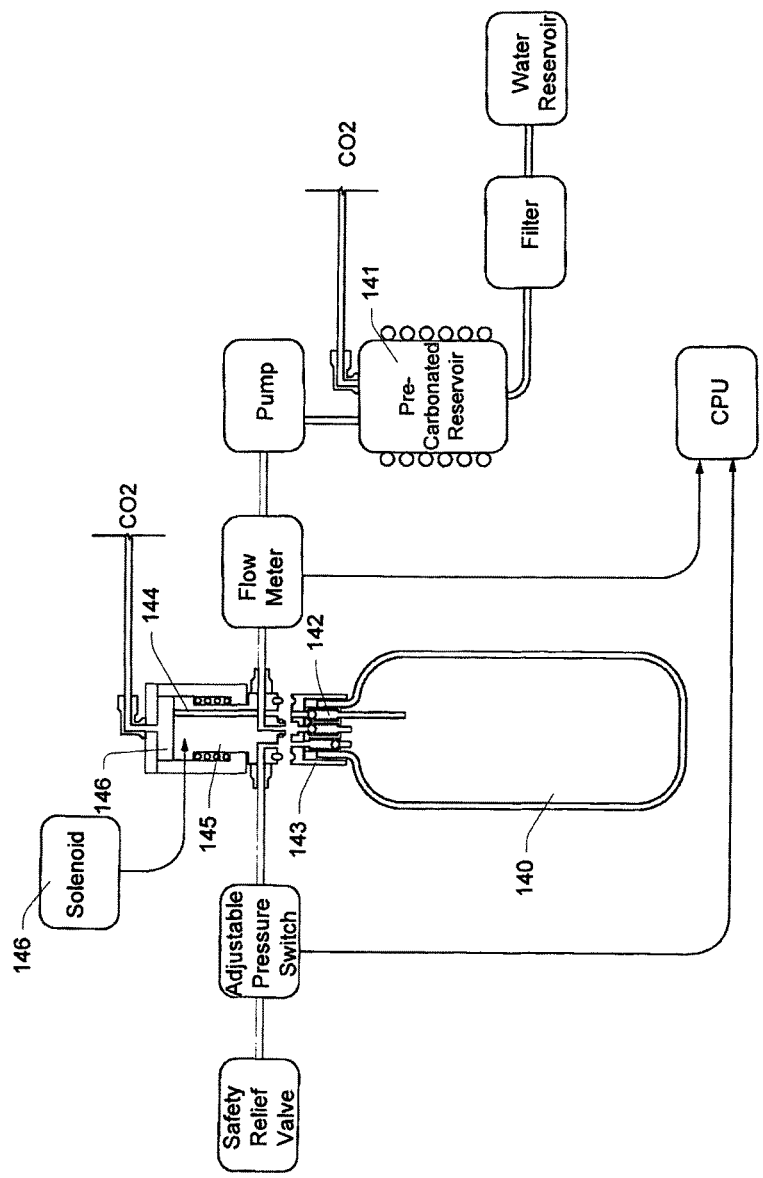
FIG. 11 is a schematic diagram of an embodiment of the invention that allows a pre-carbonated bottle content to be additionally carbonated.

FIG. 11 illustrates an embodiment where the bottle 140 is filled from a pre-carbonated reservoir 141 as previously discussed. However, a third valve 142 in the bottle's resealable cap 143 allows additional or "boost" $CO_2$ to be introduced into the carbonated contents of the bottle 140 through a passageway 144 that passes through the reciprocating coupling assembly 145. Thus, $CO_2$ is transmitted from the head space 146 above the coupling 145 through the passage 144 and past the valve 142 into the volume of the pre-carbonated water that has already been introduced into the bottle 140. In this embodiment, the reciprocating coupling 145 is preferably activated by electrical solenoid 146.

Figure 12:
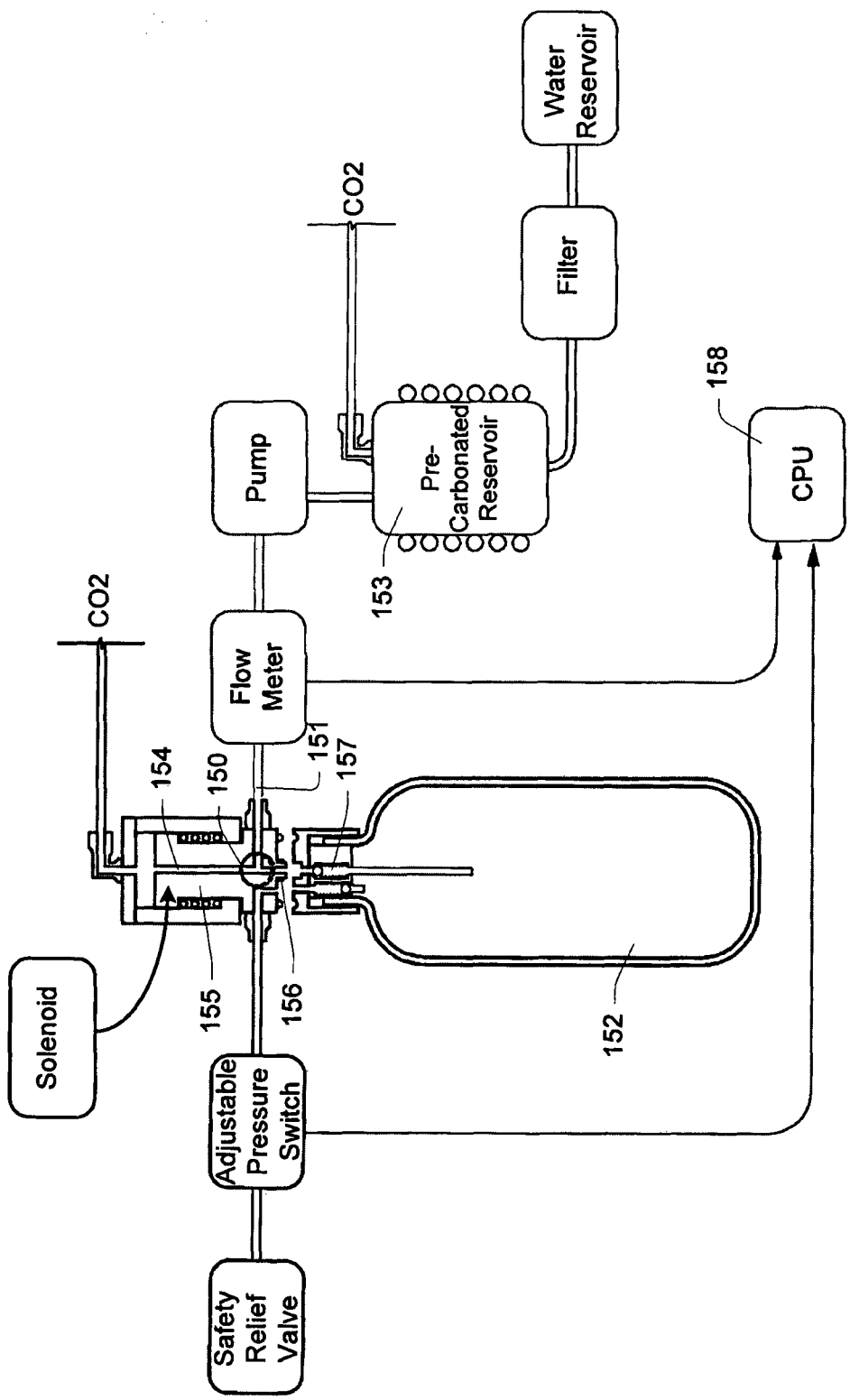
FIG. 12 is a schematic diagram of an alternate embodiment of the device depicted in FIG. 11.

FIG. 12 illustrates an embodiment similar to the one disclosed with reference to FIG. 11. However, in this embodiment, a selector valve 150 is interposed at the junction of the liquid supply line 151 that fills the bottle 152 from the reservoir 153 and the passageway 154 that allows pressurized $CO_2$ to pass through the reciprocating coupling 155. The reciprocating coupling 155 can be activated by a solenoid or by a pressurized $CO_2$. In this way, the selector can first allow liquid (and not $CO_2$) to fill the bottle 152 then, after closing the flow through the line 151, allow pressurized $CO_2$ to enter the bottle 152 through the same discharge port 156 in the reciprocating coupling 155. Thus, liquids and compressed $CO_2$ can be introduced into the bottle through the same inlet check valve 157. The selector valve 150 can be activated by the user, or in response to signals from the CPU 158. The reservoir 153 can be a still liquid or a pre-carbonated liquid.

Figure 13:
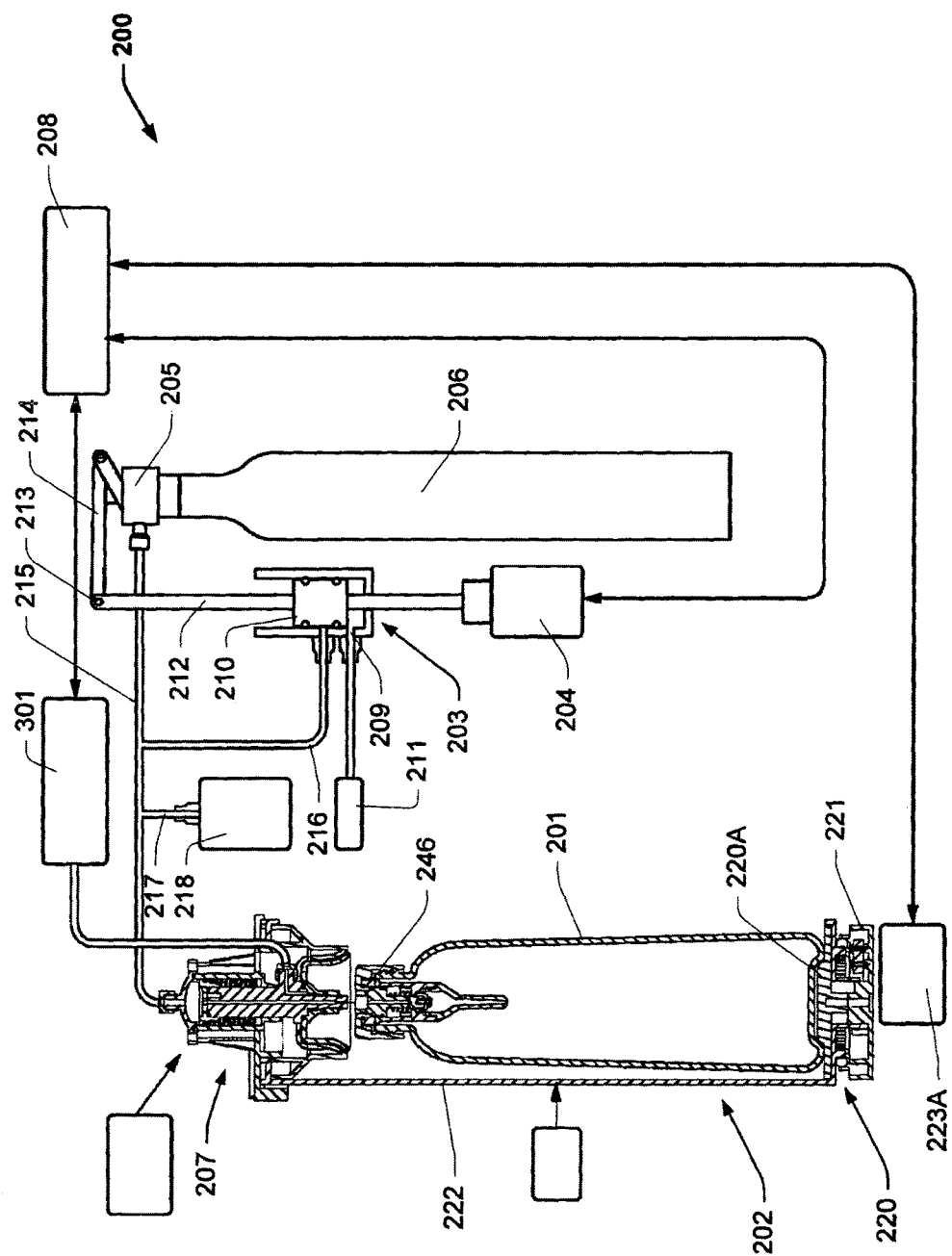
FIG. 13 is a partially schematic and partially cross-sectioned view of a domestic carbonation device.

A refined and more developed embodiment of the aforementioned technology is disclosed with reference to, for example, FIG. 13. As disclosed in FIG. 13, a device 200 for selectively and variably carbonating the contents of a user refillable bottle 201 comprises a stand and protective enclosure 202 for the bottle 201, a valve 203 that is operated by an activating motor or solenoid 204 and a dispensing coupling 205 adapted to cooperate with a $CO_2$ cylinder 206. The stand and protective enclosure 202 comprises a dispensing head 207 a pressure transducer 301 and a microprocessor 208. It will be understood that user may use input devices associates with the device 200 to specify a desired carbonation level. By using buttons associated with specific carbonation ranges or variable input devices, the microprocessor can determine the carbonation level desired by the user and coordinate the carbonation process and the extent of carbonation by monitoring the internal pressure of the bottle 201 using the pressure transducer 301. It will be appreciated that the pressure transducer 301 is in fluid communication with the interior of the bottle 201 during the entirety of the carbonation process. Accordingly, the carbonation level can be adjusted by the user and the carbonation process can be terminated by the microprocessor in accordance with the readings from the transducer 301.

Under the influence of the motor or solenoid 204, the dump or venting valve 203 reciprocates so as to open or close a $CO_2$ vent or dump port 209. When $CO_2$ from the cylinder 206 is being dispensed to the head 207, the port 209 is sealed by the valve's reciprocating piston 210. When the supply from the bottle 206 is shut off by the dispensing or cylinder coupling 205, the port 209 is opened and unnecessary pressure that is accumulated in the system is vented through an optional restrictor 211 to the atmosphere. The reciprocating motion of the valve's piston or valve element 210 is transmitted (for example) to a first actuator rod 212. The actuator rod 212 is attached, for example, by a hinge 213 to a second actuator rod 214. Accordingly, the motion of the actuating rod 212 acts to open and close the cylinder coupling 205 thereby controlling the delivery of pressurized $CO_2$ to the primary output tube 215. The primary output tube 215 has a first branch 216 that feeds $CO_2$ that has been delivered by the cylinder 206 back into the dump valve 203, but only when $CO_2$ is not actively being dispensed from the cylinder coupling 205.

The primary tube 215 may have a second branch 217 that leads to a safety valve or safety vent 218 adapted to relieve the system of overpressure.

When the cylinder coupling 205 is delivering pressurized $CO_2$ from the bottle 206, and there is no overpressure, $CO_2$ is delivered directly to the dispensing head 207.

As will be explained, the $CO_2$ delivered into the dispensing head may serve two distinct but related purposes. The first function performed by the pressurized $CO_2$ is to drive a portion of the dispensing head into engagement with the sealed bottle 201. As or after a sealing engagement is achieved between the dispensing head 207 and a user's bottle 201, $CO_2$ is delivered into the interior of the bottle 201 where carbonation of the liquid contents of the bottle can occur. When sufficient gas has been delivered to the bottle 201, the actuating motor or solenoid 204 causes system pressure to be discharged through the port 209. This causes the piston in the dispensing head 207 to retract and disengage from the bottle 201. The bottle remains sealed both before and after a hands-free filling, unlike prior art devices that require the bottle to be resealed by the user after carbonation takes place. In order to better ensure the safety of the device, the base 220 of the protective enclosure 202 may contain a motor, solenoid or other actuator 221 that is controlled by the microprocessor 208 to open and close at least one rotating or sliding protective door 222 during the carbonation process. As will be explained, a mechanical interlock prevents the door 222 from being opened by a user during the carbonation process. An optional micro switch or switch 223 provides a signal to the microprocessor 208 regarding the state of the door 222, allowing the microprocessor to detect when the door 222 is fully closed (or not). Two micro switches may be used so as to provide the microprocessor with a signal or indication of both "door open" and "door closed" states.

Figure 14:
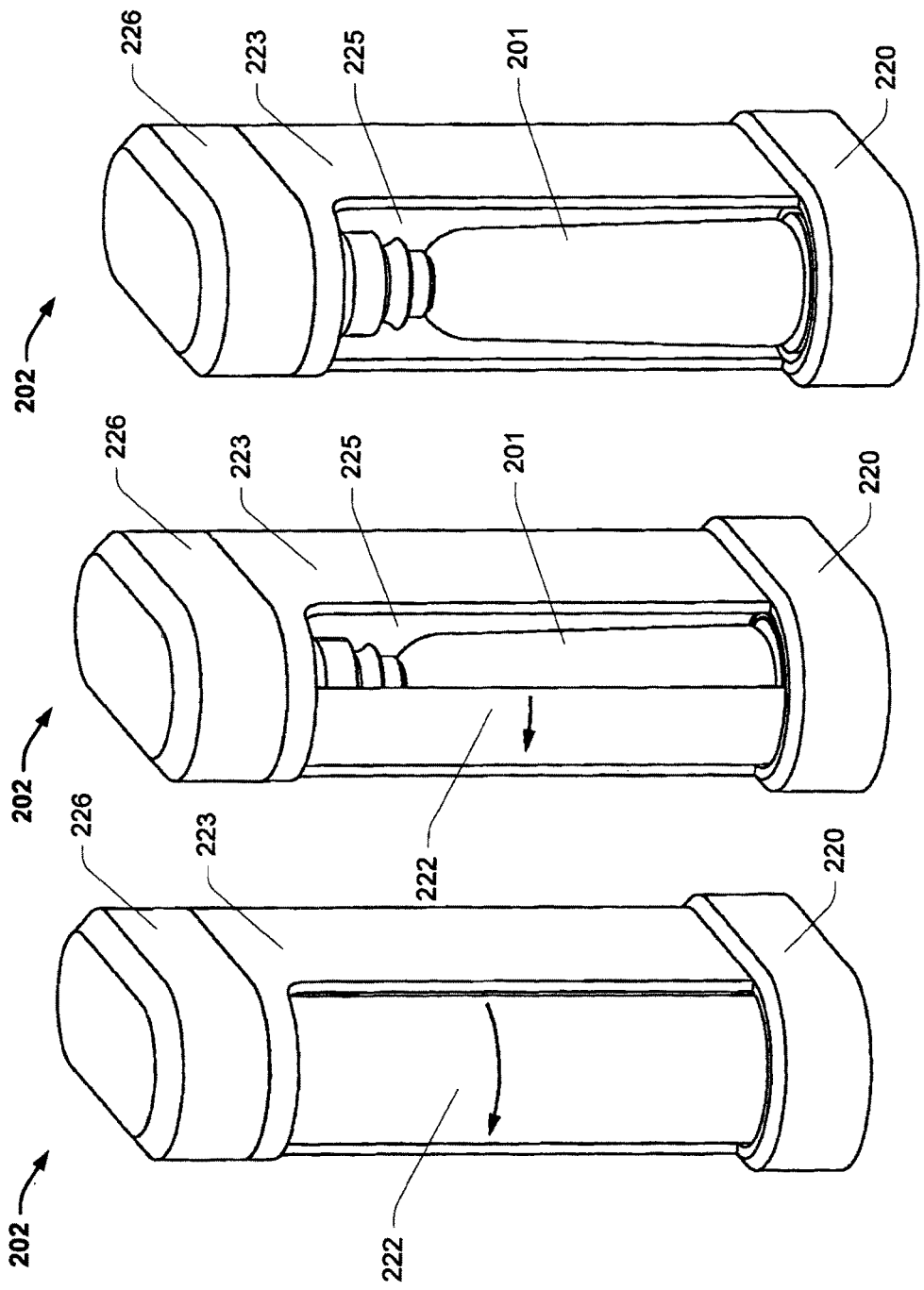
FIG. 14 is a perspective view illustrating three stages in the opening of the door to an enclosure of a domestic carbonation device.

As shown in FIG. 14, the protective enclosure may comprise a base 202 that supports an upright body 223. The upright body 223, in conjunction with the rotating or sliding door 222 defines a space 225 within which the $CO_2$ cylinder and the user refillable bottle may be located. When the door 222 is closed, the user has no access to the bottle 201. Should the user force the door open, the micro switch 223 provides a signal (or lack of signal) to the microprocessor 208. The microprocessor 208 can then terminate the carbonation process and vent the system pressure to atmosphere. The protective enclosure 202 further comprises an upper chamber 226 that contains the fill head 207, below which the bottle 201 is positioned on a mechanical location feature 220a prior to engagement with the fill head 207.

Figure 15:
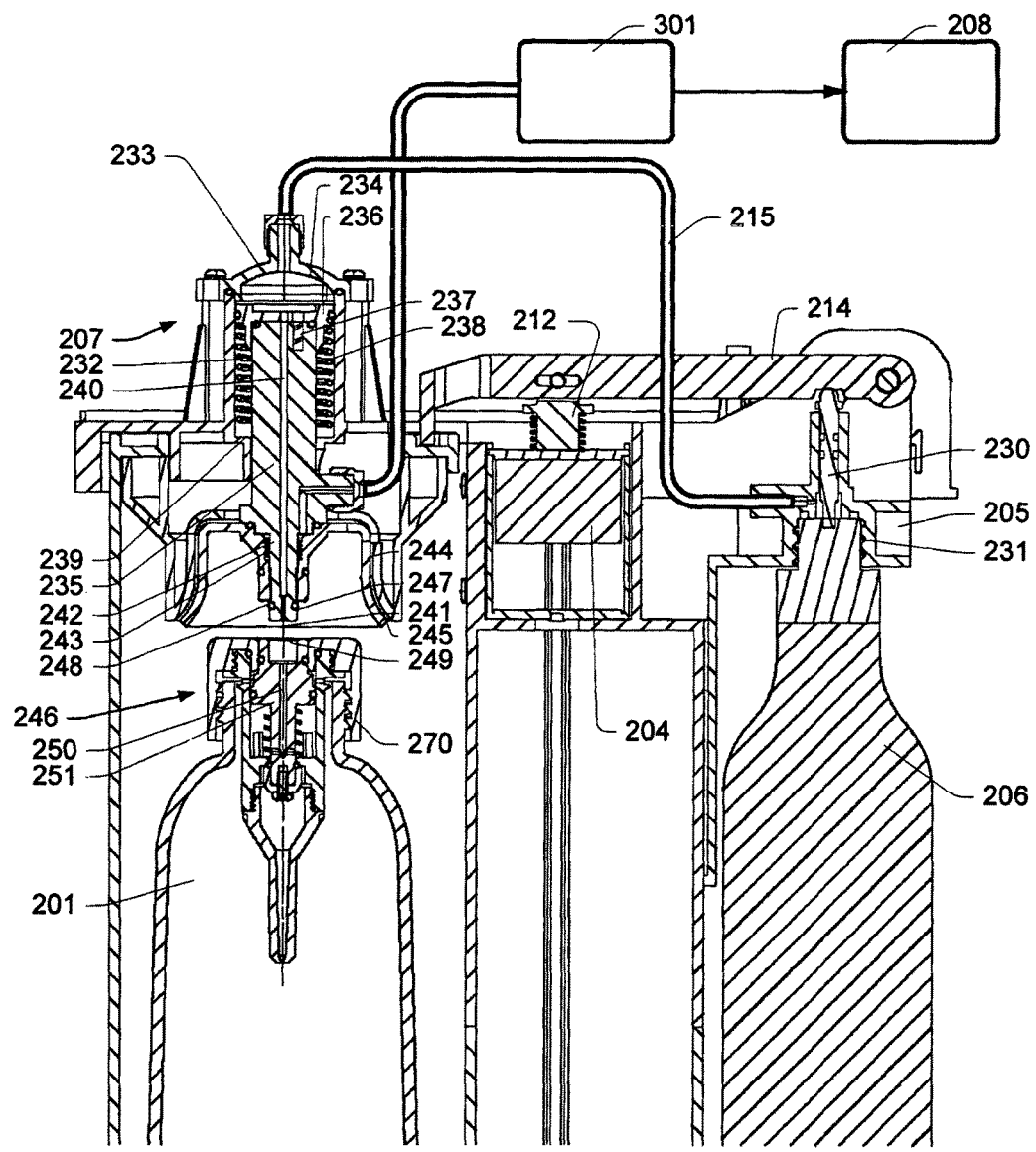
FIG. 15 is a cross sectional view through a domestic carbonation device.

As shown in FIG. 15, the cylinder's coupling and dispenser 205 receives the pressurized $CO_2$ cylinder 206. The connection between the cylinder coupling 205 and the $CO_2$ bottle 206 may be threaded 231. The coupling dispenser 205 has a dispensing actuator 230 that is acted on by the space saving mechanical linkages 212, 214, etc. that extend (generally at or below the level of the actuation or pin 230) between the solenoid or motor 204 and the actuator 230. Depressing or activating the actuator 230 causes pressurized $CO_2$ to be dispensed into the primary delivery line 215.

The primary output line 215 enters an uppermost portion of the fill head 207. In this example, the fill head 207 comprises a primary cylinder 232 that is terminated at one end by a cap 233 that forms a concave or dome 234 above the cylinder 232. The cylinder 232 contains a reciprocating primary piston 235. A spring retaining cap 236 is affixed to an upper end of the piston 235 by a retaining screw or fastener 237. The spring retaining cap 236 captures a return spring 238 between the cap 236 and the other end 239 of the cylinder 232. A dispensing bore, in this example, a central longitudinal bore 240 communicates $CO_2$ from the output 215 to a supply opening 241 located on a distal tip of the piston 235. A delivery end 242 of the piston 235 is preferably threaded 243 to receive a pilot or guide skirt 244 that is adapted to cooperate with a size and shape of the threaded cap of the bottle whose contents are being carbonated. The pilot cap 244 is outwardly flared at its lower end 245 to permit a certain amount of misalignment between the bottle 201 and the reciprocating piston 235. The skirt guides the bottle's threaded fill cap assembly 246 into the correct engagement with the piston 235. The distal tip 247 of the piston 235 contains the supply opening 241 that is reduced in diameter with respect to the remainder of the central bore 240. The distal tip 247 also includes a circumferential groove and seal 248 that cooperate with a cylindrical recess 249 formed in the fill cap assembly 246. Extension of the piston 235 under the influence of the incoming pressurized $CO_2$ drives the distal tip 247 into engagement with receiving opening 249 in the fill cap assembly. When the tip 247 is properly seated in the opening 249, the $CO_2$ delivered through the discharge opening 241 is sealed with respect to the atmosphere and can only enter the primary entry port 250 of the fill cap 246. The entry port is through the secondary fill piston 251. The motion of the piston 235 also drives the fill port reciprocating valve piston element (or secondary piston) 251 downward, thereby opening a passageway between the incoming gas and the interior of the bottle 201.

Figure 16:
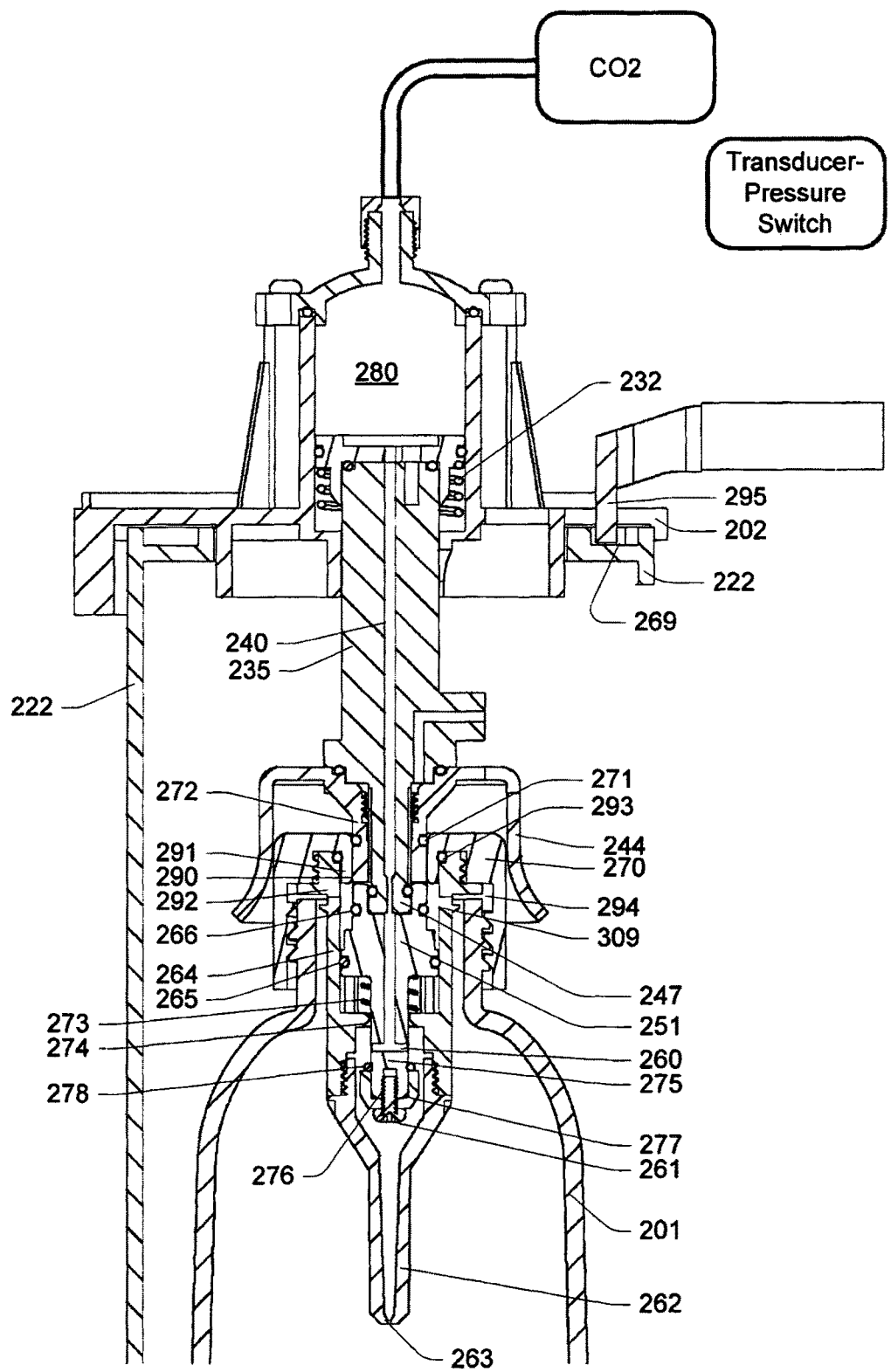
FIG. 16 is a cross sectional view of the fill head of a domestic carbonation device.

As shown in FIG. 16, extension of the piston 235 compresses the return spring 232, engages the distal tip 247 of the piston with the fill cap valve element (or secondary piston) 251 and drives the valve element 251 downward. This opens or exposes the one or more transverse ports 260 (located at a lower portion of the reciprocating valve element 251) to a space 261 that is in fluid communication with the interior of the bottle 201. The space 261 is preferably contained within an elongated tip 262 having a small discharge opening 263 that admits pressurized $CO_2$ into the interior of the bottle 201 and prevents influx of liquid into the mechanism of the fill cap. The tip 262 may be threadedly engaged with the fill cap's entry (or secondary) cylinder 264. A first circumferential groove and polymeric seal 265 around the fill piston 251 prevents air delivered from the transverse ports 260 to enter the cylinder space above the seal 265. Second seals 266 located on the piston 251 above the first seals 265 seal the piston with respect to the bottle's threaded fill cap 270 when the fill cap is in a resting and sealed position (see FIG. 15). An additional third seal 271 is located in the circumferential groove around the internal neck 272 of the pilot cap 244. These seals engage the entry into threaded outer cap 270 of the bottle when the piston 235 is extended. Extension of the fill piston 251 compresses a spring 273 interposed between a lower shoulder of the fill piston and the upper surface of an internal shoulder 274 that defines the lower extent of the fill cap's cylinder (secondary cylinder) 264. A lowermost extent of the fill cap's piston 251 comprises a tip 275 through which may extend the radial discharge ports 260. The tip 275 may also have an axially threaded opening 276 or other means for affixing a retaining cap 277 that prevents downward the escape of a tip seal 278.

The tip seal 278 abuts against a lower surface of the shoulder 274 after the gas is discharged into the bottle and the fill head's piston 235 retracts. Thus, pressurized gas in the fill head's cylinder 280 is delivered through the bore 240 through the discharge ports 260 and into the interior of the bottle 201 through the discharge opening 263. When the system pressure is vented, the fill head's primary piston 235 retracts as does the cap's secondary piston 251. Retraction of the cap's secondary piston 251 reseals the bottle 201 and prevents the escape of pressure after the carbonation process is completed. The user need not and cannot handle the bottle 201 during the carbonation process.

As shown in FIG. 16, preferred embodiments of the cap assembly include an external threaded cap portion 270 having a entry opening 290 defined by a descending neck or rim 291 within which is contained a threaded spacer 292 that is sealed against the interior of the cap by a polymeric seal 293. The spacer 292 is further sealed against the upper rim of the threaded opening of the bottle 201 by a "T" shaped seal 294. Note that in this orientation, a mechanical extension or finger 295 associated with the movement of the solenoid or motor 204 passes through the body of the protective enclosure 202 and engages a recess 296 in the door 222 thus mechanically interfering with the opening of the door when gas is being discharged into the bottle 201.

Figure 17:
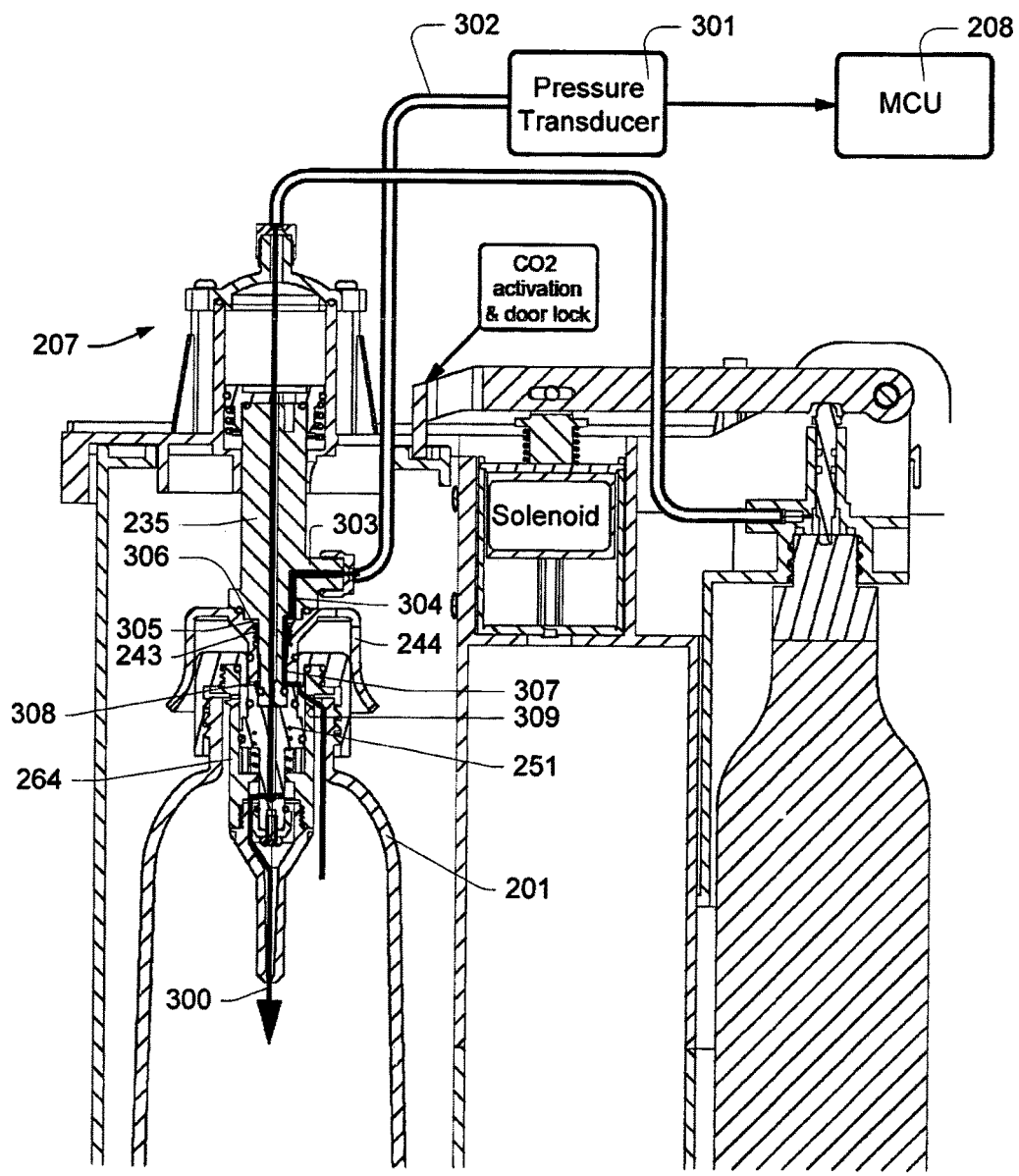
FIG. 17 is a cross sectional view illustrating the flow paths for CO2 and the fluid communication between the interior of a bottle and the pressure transducer.
Figure 17A:
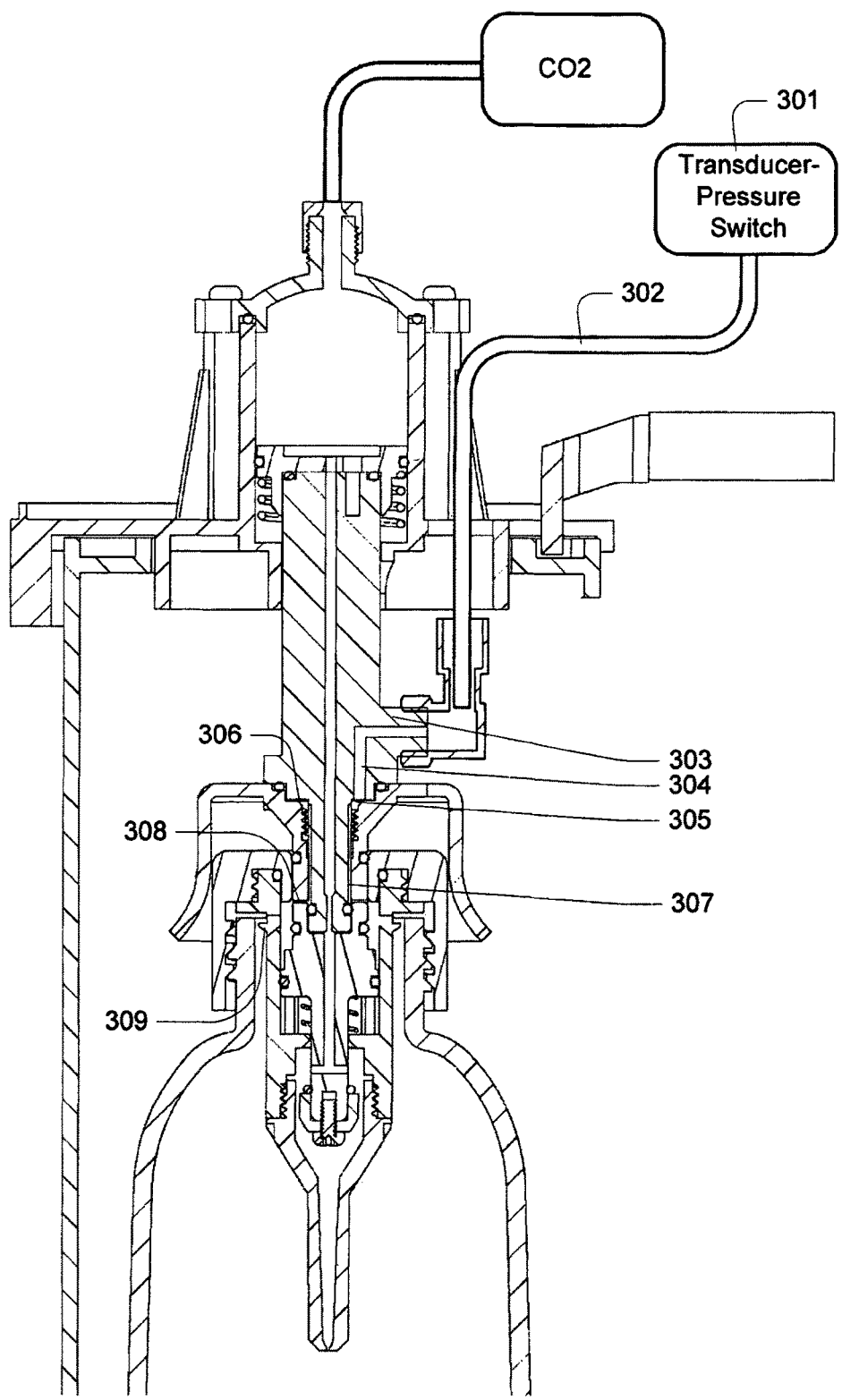
FIG. 17a is a cross sectional view of a dispensing head and the fluid or gas passageway between the interior of the bottle and a pressure transducer.

As shown in FIG. 17, when pressurized $CO_2$ 300 is being delivered into the bottle 201 a pressure transducer 301 is able to detect, read and quantify the pressure in the interior of the bottle 201. The pressure transducer 301 communicates with the device's microprocessor 208 and provides the microprocessor with continuous and generally instantaneous pressure readings from the interior of the bottle 201. The pressure transducer is connected by a sealed passageway 302 to a radially extending port 303 formed on the fill head's reciprocating fill piston 235. A passageway 304 internal to the piston 235 communicates with an air space 305 located between a downward facing shoulder 306 on the piston 235 and the pilot cap 244. The space 305 may be formed by chamfering the area around the upper part of the threaded connection 243 (or via a vertical slot in the threads) between the piston 235 and the pilot cap 244. The space or void 305 communicates via the air space in the threaded connection 243 to a cylindrical gap 307 that extends around the lower end of the piston 235, between the lower end of the piston 235 and the interior neck 272 of the pilot cap 244. This gap communicates with a second gap 208 that is located between the lowest extent of the neck 272 and the upper surface of the cap's fill piston 251. The gap is defined by the relationship of the cap 244, fill head piston 235, its distal tip 247 and the internal floor of the receiving recess 249. The gap cannot be closed in particular by extending the fill head's piston 235. Pressure is further communicated from the gap 308 through an opening 309 in the cylinder 264 into the interior space of the bottle 201. When carbonation is completed, the opening 309 is sealed from the atmosphere by the second seal 266 being in contact with the interior of the cap's descending rim 291.

Figure 18:
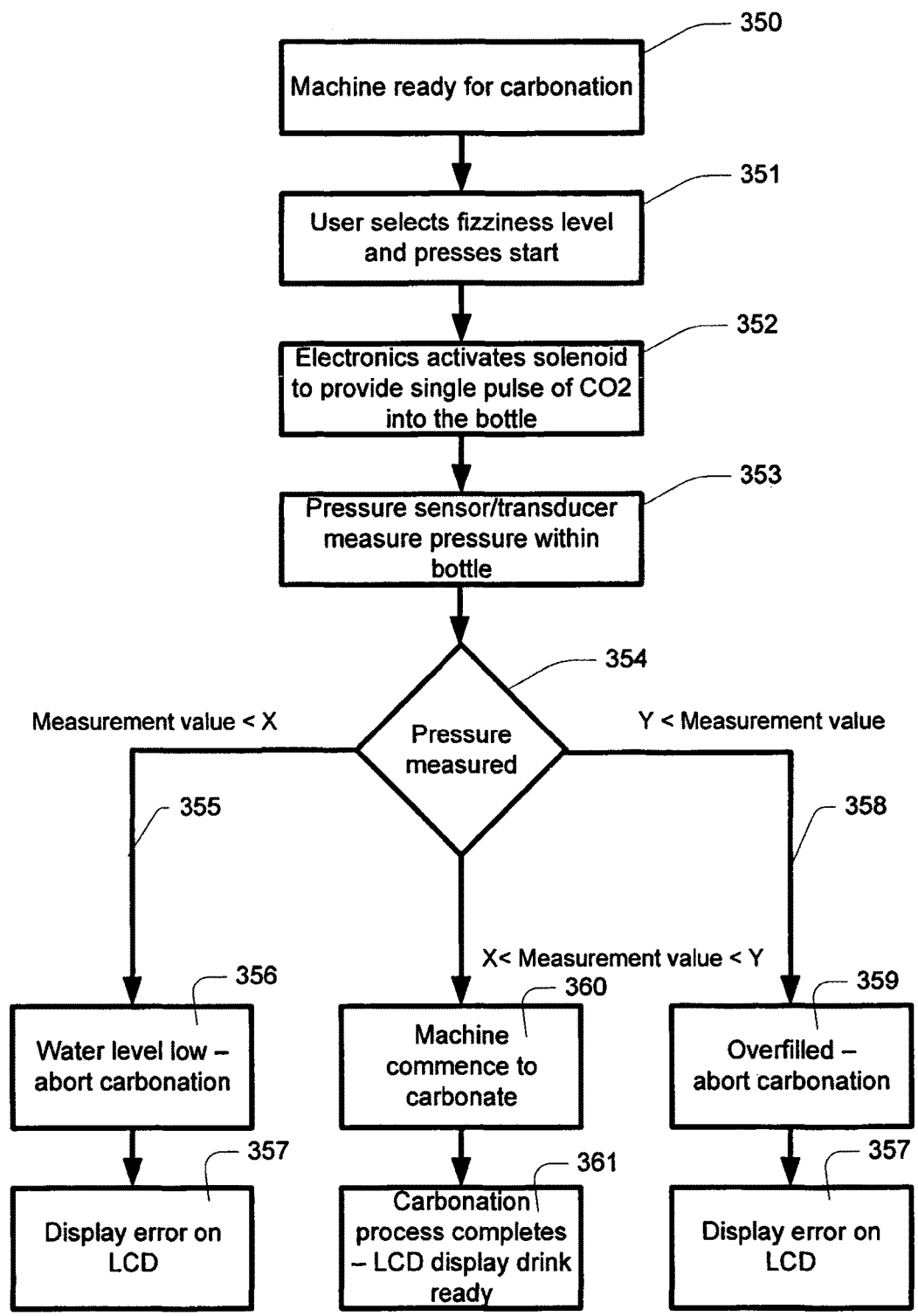
FIG. 18 is a flow chart illustrating the use of a pressure transducer in a domestic carbonation device.

As suggested by FIG. 18, pressure readings from the interior of the bottle 201, as made by the pressure transducer 301 may be used to determine the volume of liquid contained in the bottle 201 and thereby prevent over pressurization of the bottle 201. As suggested by FIG. 18, the device's microprocessor first determines 350 if the device is ready to commence a carbonation operation. This may include detecting the presence of the bottle 201, the state of the door or other factors as may be convenient or required. Once the microprocessor determines that the conditions are suitable, the user is allowed to select a level of carbonation or fizziness 351 which will ultimately be represented by the final $CO_2$ pressure within the bottle 201. Thereafter, the solenoid or motor 204 is commanded by the microprocessor to activate for the purpose of delivering a single relatively short pulse of $CO_2$ 352 into the bottle 201. With the fill head 207 extended and in sealing engagement with the bottle 201, the pressure sensor or transducer 301 measures the resultant pressure within the bottle as previously explained with reference to FIG. 17. The pressure reading is communicated to the microprocessor 353. The microprocessor 208 then uses the measurement from the pressure transducer to make a determination based on comparing the measured pressure to a first pre-established safe pressure value 254. If the measured pressure is less than the expected value 355 the microprocessor uses this as an indication that the liquid level is too low and the carbonation process is aborted 356. This result may be displayed as an error message, or audible or visual alarm to the user 357. The error message may be displayed on an LCD located on or associated with the device 200. If the pressure value measured by the transducer is greater than the pre-established second reference or safety value representative of excess pressure 358, the microprocessor determines that the bottle contains an excessive amount of liquid and the carbonation process is aborted 359. This result is displayed or announced to the user in the manner previously described 357. If the pressure transducer indicates to the microprocessor that the measured pressure value is between the pre-established values associated with low fluid level 355 and excess fluid 358, then the carbonation process is resumed after the initial pulse so as to commence a full carbonation cycle 360. At the end of the carbonation cycle, an appropriate display or audible signal is provided to the user 361. This may be done after the door interlock is released so that the use does not attempt to open the door when the indication 361 is provided.

Figure 19:
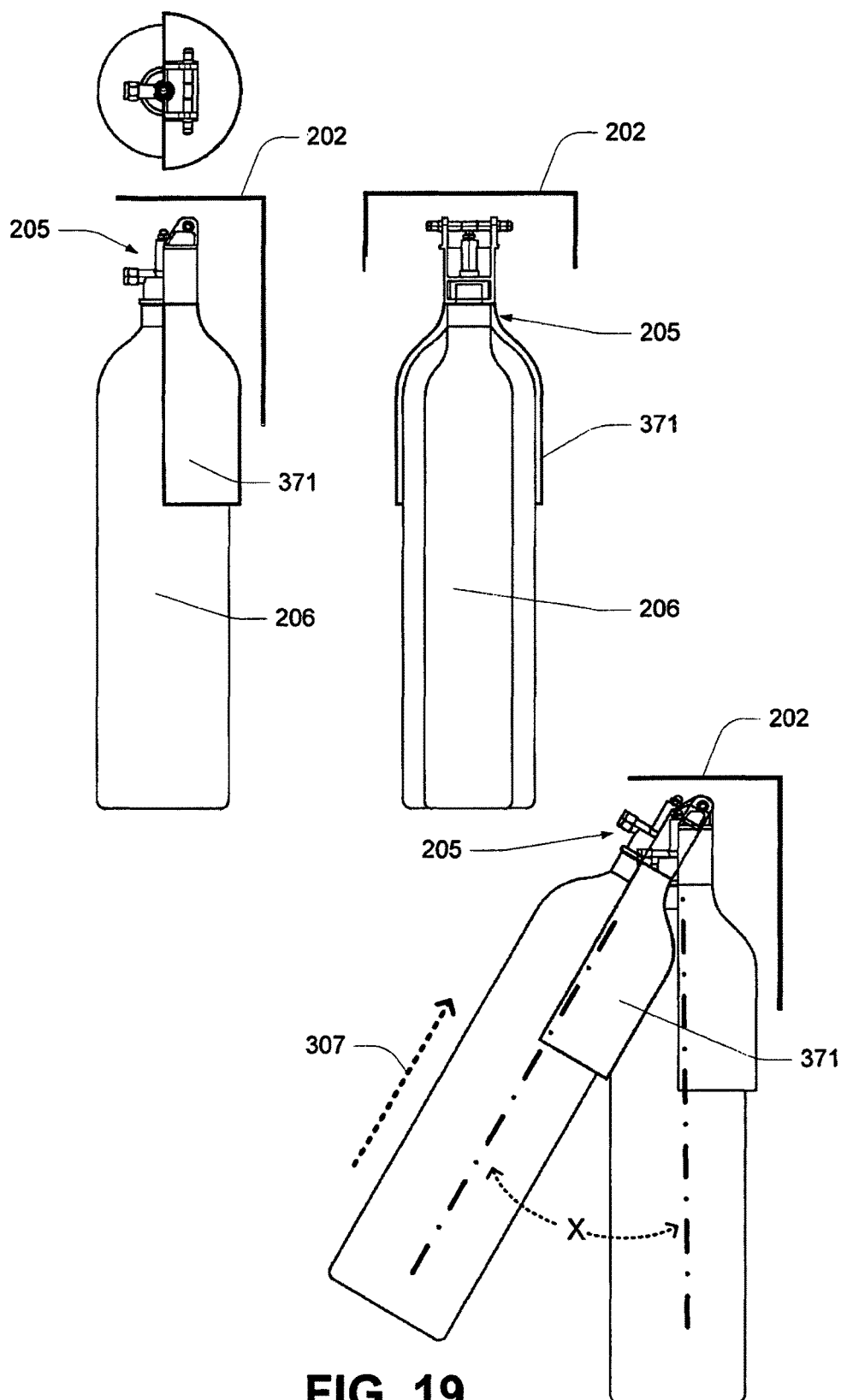
FIG. 19 is an elevation view illustrating a discharge coupling and CO2 cylinder that is attached to but pivots about an enclosure of a domestic carbonation device.

With respect to prior art units, the insertion of the pressurized $CO_2$ supply bottle 206 onto the cylinder coupling 205 can be simplified by providing a cylinder coupling 205 that can be inclined relative to the vertical. In some embodiments of the present invention, the dispending coupling 205 is pivotally attached to an interior of the protective enclosure 202. In this way, the dispensing coupling 205 can be pivoted with respect to the vertical axis by an angle X. This allows the $CO_2$ bottle 206 to be advanced 370 toward the coupling 205, then threaded onto the coupling 205 in the usual way. After the $CO_2$ bottle 206 is threaded onto the coupling 205 the bottle and coupling can be rotated in unison, through angle X back into a vertical orientation within or outside of the protective enclosure to which they are attached. The dispensing coupling 205 may be associated with a guide or guide shroud that facilitates orientation of the bottle 206 relative to the coupling 205. In this example, the shroud 371 is shaped to cooperate with the shape with the upper portion of the bottle 206. It forms a conforming skirt around the upper portion of the bottle. It may extend the full length of the bottle or a fraction of the length of the bottle as shown in FIG. 19.

Figure 20:
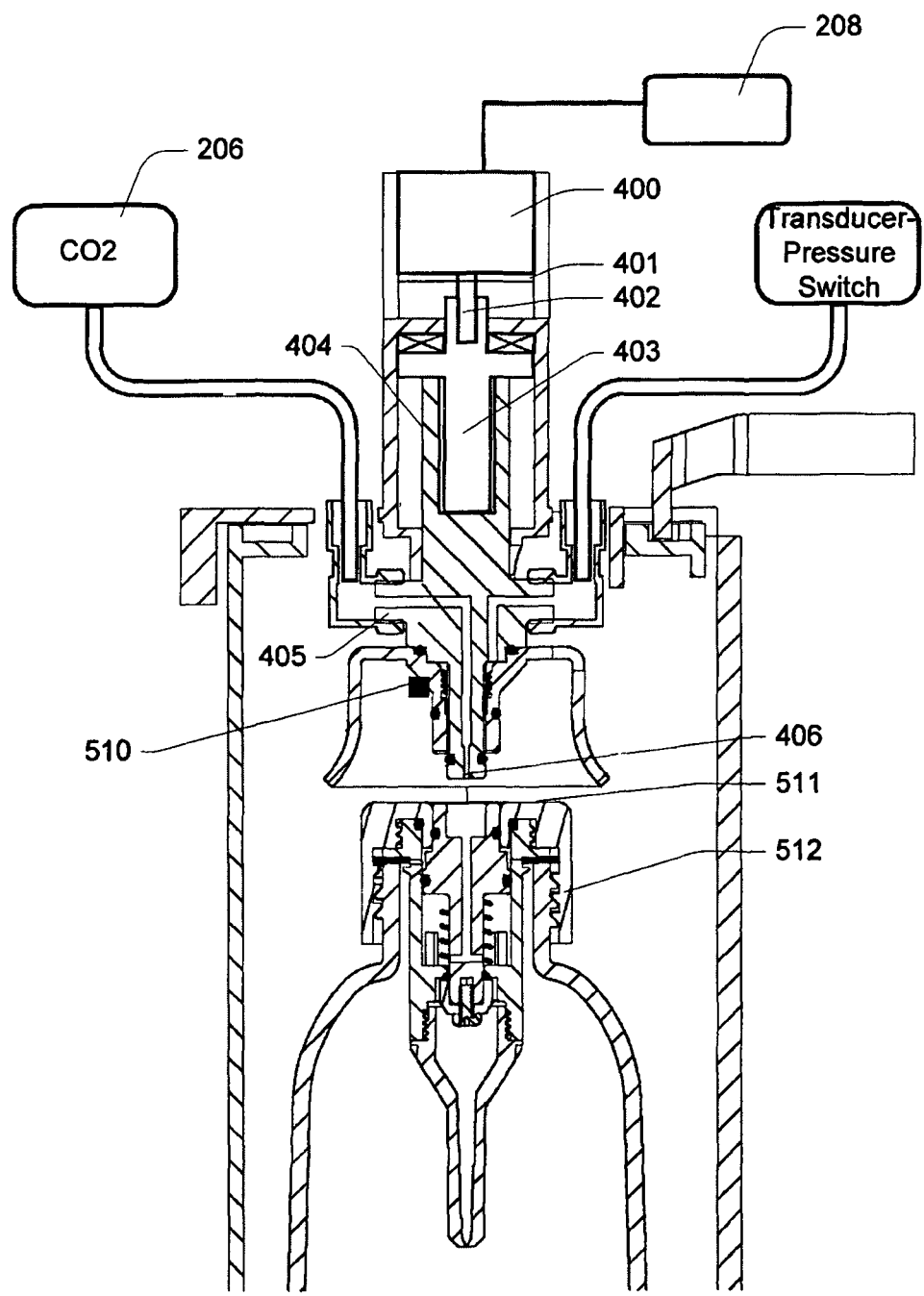
FIG. 20 is a cross sectional view, partially in schematic, illustrate a dispensing head that is motorised.
Figure 21:
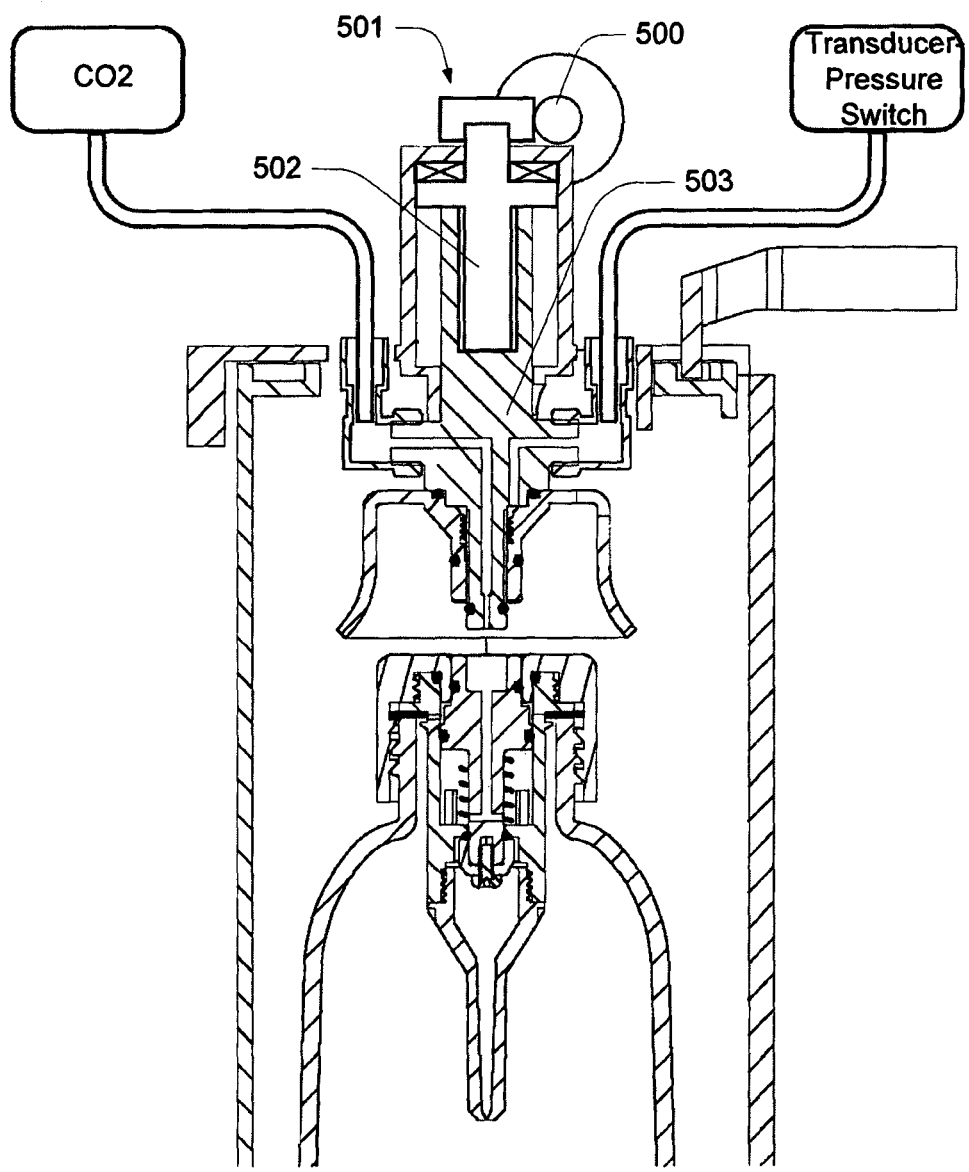
FIG. 21 is a cross sectional view a second embodiment of a motorised dispending head.

Previously described examples utilise pressurised $CO_2$ to activate the primary piston in the dispensing head. However, it will be understood that the piston can be advanced in other ways and without the use of pressurized gas. FIG. 20 illustrates an embodiment where an electric motor 400 with or without a gear box 401 has a rotating and vertical output 402 that rotates a vertically arranged helical type gear or screw 403 that is received by a cooperating threaded female component 404. The component 404 serves the purpose of the primary piston, having an external threaded connection 405 for receiving pressurized $CO_2$ from the cylinder 206. The connection 405 is preferably threaded and may be located on any part of the component 404. In this example, it is directed radially but ultimately discharges vertically through the discharge opening 406. Accordingly, operating the motor under the influence of the microprocessor 208 causes the vertically reciprocating motion of the component 405 (in synchrony with the cylinder coupling discharge valve) that is required to complete a carbonation cycle. A similar arrangement is depicted in FIG. 21 except that the motor's output shaft 500 is in a horizontal plane and cooperates with a worm gear arrangement 501 that drives the helical gear 502 that causes the reciprocating motion of the dispensing head's male filling component 503.

Figure 22:
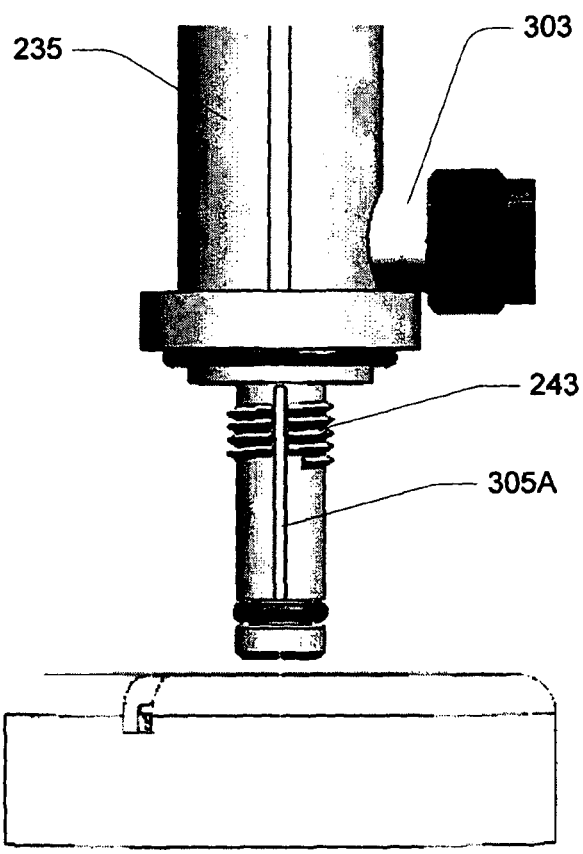
FIG. 22 is a side view of an embodiment dispending head.

FIG. 22 shows a side view of an embodiment dispending head. The space or void 305A communicates via the air space in the threaded connection 243.

It will be appreciated that the various advantageous features disclosed with reference to the components of the device including the fill head, discharge coupling, microprocessor, pressure transducer, fill cap, protective enclosure, microswitches, valves and doors may be used in a variety of combinations and permutations. Not all the features disclosed with one embodiment need be incorporated in any other embodiment. It will also be appreciated that where an example is given, the precise type of electrical or mechanical component, need not be identically used and that many teachings are disclosed by way of broad example in this specification. Similarly, the shape of the fill cap and protective doors and enclosure and the precise manner or sequence in which the device operates should not be seen as limitations in the scope of the claims simply because they form useful examples in the specification. Where male and female components such as fittings and couplings are disclosed, it will be appreciated that the orientation of the male and female components such as couplings, threads and bayonet fittings can generally be reversed without adverse consequence as would be appreciated by those of ordinary skill in this art. The location of components disclosed represents an exemplary embodiment and should not be interpreted as a literal requirements of the invention, unless specified as such.

While the present invention has been disclosed with reference to particular details of construction, these should be understood as having been provided by way of example and not as limitations to the scope or spirit of the invention.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

What is claimed is:

1. A device for carbonating a liquid, the device comprising:
   a carbonation head, pressure transducer and processor module; wherein the carbonation head is connectable to a bottle whose liquid contents are to be carbonated and has a first through passageway that, when connected, distributes pressurised carbon dioxide to an interior of the bottle; and a second passageway that communicates a pressure within the bottle to the pressure transducer; and
   the processor module is coupled to the pressure transducer to receive a signal indicative of the pressure within the bottle; wherein
   the processor module, prior to commencing carbonation, causes delivery of a single short predetermined pulse of a gas into the bottle, and the pressure transducer subsequently measures a resultant pressure within the bottle;
   the processor module being further adapted to monitor the resultant pressure within the bottle and to compare the measured pressure to a predetermined safe pressure range defined by a lower first pressure value and a upper second pressure value for confirming a safe volume of liquid in the bottle; such that, if the measured pressure is within the safe pressure range, the processor can cause the device to commence carbonation of the liquid.

2. The device according to claim 1, further comprising:
   a solenoid venting valve element that reciprocates so as to open or close a carbon dioxide vent, the reciprocating motion being transmitted to open and close a cylinder coupling that controls delivery of the pressurized carbon dioxide from a carbon dioxide cylinder;

wherein the carbon dioxide vent is sealed by the valve element when the device is dispensing carbon dioxide; and the carbon dioxide vent is opened by the valve element to release pressure from the device to the atmosphere.

3. The device according to claim 2, wherein: the bottle whose contents are to be carbonated is sealed and the device is adapted such that a portion of the carbonation head is drivable into engagement with the sealed bottle by means of pressurized carbon dioxide delivered from a cylinder, the bottle remaining sealed both before and after a hands-free filling.

4. The device according to claim 2, further comprising a carbonation head having a cylinder that contains a reciprocating primary piston with a dispensing bore that dispenses carbon dioxide from a supply opening located on a distal tip of the reciprocating primary piston;
the reciprocating primary piston having a guide skirt that is adapted to cooperate with a size and shape of a fill cap of a bottle whose contents are being carbonated.

5. The device according to claim 2 wherein:
the device is adapted for use with a fill cap of the bottle whose contents are to be carbonated; the fill cap comprises a valve mechanism having a piston and a cylinder; and the valve dispensing into a space having a small discharge opening that admits pressurized carbon dioxide into the interior of the bottle and prevents influx of liquid into the valve mechanism of the fill cap.

6. The device according to claim 2 wherein:
the carbonation head has a reciprocating fill piston that defines at least part of the second passageway.

7. The device according to claim 2, wherein:
during a commotion process, the pressure transducer remains in fluid communication with the interior of the bottle to which the carbonation head is connected; the processor module being adapted to receive the signal indicative of a substantially continuous and substantially instantaneous pressure measure within the bottle; the processor module being further adapted to monitor the pressure within the bottle to determine when a user configured carbonation level is reached; the processor module terminating the carbonation process when it is determined the carbonation level is reached.

8. The device according to claim 1, the device further comprising:
a user input for selecting a desired carbonation level, wherein the processor module is adapted to control the device to stop the carbonation process when the desired carbonation level has been achieved in the bottle.

9. The device according to claim 1, wherein:
the carbonation head has a reciprocating fill piston that defines at least part of the second passageway.

10. The device according to claim 9, wherein:
the carbonation head has a pilot cap coupled to the reciprocating fill piston; and
the second passageway communicates with an outlet around a lower end of the reciprocating fill piston, between the lower end of the reciprocating fill piston and an interior neck of the pilot cap; and wherein:
the second passageway communicates via an air space in the threaded connection between the reciprocating fill piston and the pilot cap; and wherein
at least part of the second passageway may further be internal to the reciprocating fill piston; and the second passageway may communicate with an air space located between a downward facing shoulder on the reciprocating fill piston and the pilot cap.

11. The device according to claim 10, the device further comprising:
a bottle fill cap that sealingly engages the bottle whose contents are to be carbonated; the bottle fill cap having a fill cap piston;
wherein the second passageway communicates via a gap between the lowest extent of the neck of the pilot cap and an upper surface of the fill cap piston; the gap is defined by an interrelationship of the cap, a distal tip of the fill cap piston, an internal floor of a receiving recess defined by the fill cap.

12. The device according to claim 1, wherein:
the bottle whose contents are to be carbonated is sealed and the device is adapted such that a portion of the carbonation head is drivable into engagement with the sealed bottle by means of pressurized carbon dioxide delivered from a cylinder, the bottle remaining sealed both before and after a hands-free filling.

13. The device according to claim 1, further comprising:
a car Donation head having a cylinder that contains a reciprocating primary piston with a dispensing bore that dispenses carbon dioxide from a supply opening located on a distal tip of the reciprocating primary piston;
the reciprocating primary piston having a guide skirt that is adapted to cooperate with a size and shape of a fill cap of a bottle whose contents are being carbonated.

14. The device according to claim 1, wherein:
the device is adapted for use with a fill cap of the bottle whose contents are to be carbonated, the fill cap comprises a valve mechanism having a piston and a cylinder; and
the valve dispensing into a space having a small discharge opening that admits pressurized carbon dioxide into the interior of the bottle and prevents influx of liquid into the valve mechanism of the fill cap.

15. The device according to claim 1, wherein:
the device is adapted to cooperate with a bottle fill cap, which is removably attachable to the bottle whose contents are to be carbonated, the bottle fill cap lacking bayonet or thread features for engaging the carbonation head, the bottle fill cap further having an internal reciprocating piston that opens and closes a passageway into the interior of the bottle to which it may be attached.

16. The device according to claim 1, wherein: during a carbonation process, the pressure transducer remains in fluid communication with the interior of the bottle to which the carbonation head is connected; the processor module being adapted to receive the signal indicative of a substantially continuous and substantially instantaneous pressure measure within the bottle; the processor module being further adapted to monitor the pressure within the bottle to determine when a user configured carbonation level is reached; the processor module terminating the carbonation process when it is determined the carbonation level is reached.

17. The device according to claim 1, wherein: during a carbonation process, the pressure transducer remains in fluid communication with the interior of the bottle to which the carbonation head is connected; the processor module being adapted to receive the signal indicative of a substantially continuous and substantially instantaneous pressure measure within the bottle; the processor module to cause a single relatively short pulse of carbon dioxide to be released into the bottle; and wherein, if the measured pressure is less than the predetermined first safe pressure value, the processor module determines the liquid level in the bottle is too low and aborts the carbonation process; and if the measured pressure is greater than the predetermined second safe pressure value, the processor module determines the liquid level in the bottle is too high and aborts the carbonation process.

18. The device according to claim 17, wherein:

the processor module is adapted to cause an error message to be communicated to the user, the error message being in the form of either a displayed message or an audile alarm or a visual alarm.

* * * * *